United States Patent [19]
Kravitz et al.

[11] Patent Number: 5,832,089
[45] Date of Patent: Nov. 3, 1998

[54] OFF-LINE COMPATIBLE ELECTRONIC CASH METHOD AND SYSTEM

[75] Inventors: David W. Kravitz; Peter S. Gemmell; Ernest F. Brickell, all of Albuquerque, N. Mex.

[73] Assignee: Sandia Corporation, Albuquerque, N. Mex.

[21] Appl. No.: 474,035

[22] Filed: Jun. 7, 1995

[51] Int. Cl.$^6$ ............................... H04K 1/00; H04L 9/30
[52] U.S. Cl. ................................ 380/24; 380/25; 380/28; 380/30; 705/39
[58] Field of Search ................................. 380/23, 24, 25, 380/28, 30, 49, 21; 235/379, 380; 364/408; 395/217, 239, 241; 705/17, 39, 41

[56] References Cited

U.S. PATENT DOCUMENTS

| | | | |
|---|---|---|---|
| 4,977,595 | 12/1990 | Ohta et al. | 380/24 |
| 5,305,383 | 4/1994 | Guillou et al. | 380/24 |
| 5,511,121 | 4/1996 | Yacobi | 380/24 |
| 5,521,980 | 5/1996 | Brands | 380/30 |
| 5,539,825 | 7/1996 | Akiyama et al. | 380/24 |

OTHER PUBLICATIONS

D. Chaum "Blind Signatures For Untraceable Payments," Advances in Cryptology—Proceedings of CRYPTO 82 (1983) pp. 199–203, Plenum Press.

Gennady Medvinsky and B. Clifford Neuman, "Net Cash: A design for practical electronic currency on the Internet." *Journal of Petroleum Technology*, vol. 8, pp. 95–97, Sep., 1956.

Jan L. Camenisch, Jean–Marc Piveteau, and Markus A. Stadler, "An Efficient Electronic Payment System Protecting Privacy," Institute for Theoretical Computer Science, Union Bank of Switzerland, pp. 207–215.

Stefan Brands, "Electronic Cash Systems Based On the Representation Problem in Groups of Prime Order", pp. 26.1–27.1.

David Chaum, Amos Fiat and Moni Naor, "Untraceable Electronic Cash," pp. 319–327.

*Primary Examiner*—Thomas H. Tarcza
*Assistant Examiner*—Pinchus N. Laufer
*Attorney, Agent, or Firm*—V. Gerald Grafe

[57] ABSTRACT

An off-line electronic cash system having an electronic coin, a bank B, a payee S, and a user U with an account at the bank B as well as a user password $z_{u,i}$, has a method for performing an electronic cash transfer. An electronic coin is withdrawn from the bank B by the user U and an electronic record of the electronic coin is stored by the bank B. The coin is paid to the payee S by the user U. The payee S deposits the coin with the bank B. A determination is made that the coin is spent and the record of the coin is deleted by the bank B. A further deposit of the same coin after the record is deleted is determined. Additionally, a determination is made which user U originally withdrew the coin after deleting the record. To perform these operations a key pair is generated by the user, including public and secret signature keys. The public signature key along with a user password $z_{u,i}$ and a withdrawal amount are sent to the bank B by the user U. In response, the bank B sends a coin to the user U signed by the secret key of the bank indicating the value of the coin and the public key of the user U. The payee S transmits a challenge counter to the user U prior to receiving the coin.

24 Claims, 13 Drawing Sheets

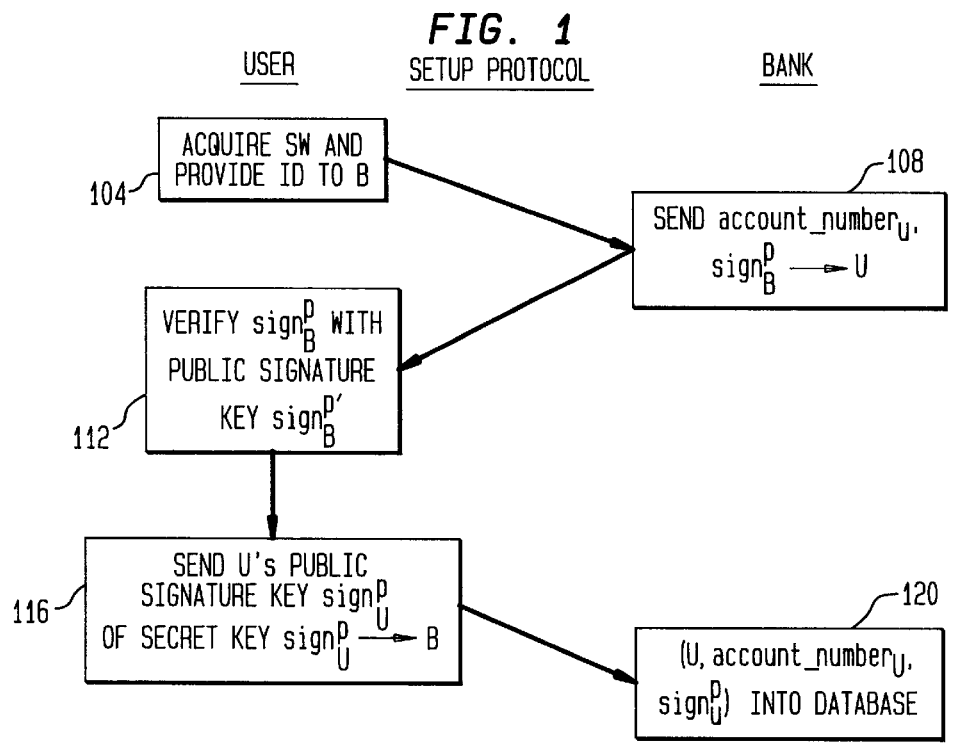
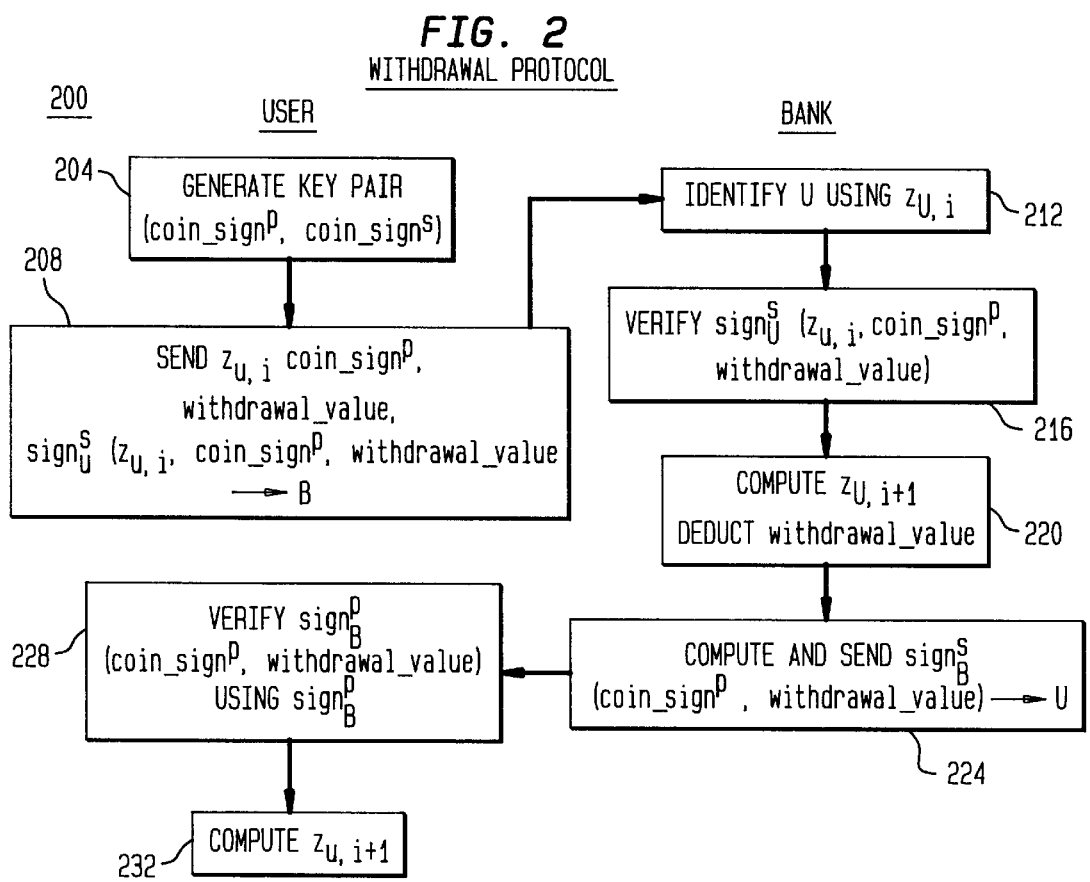

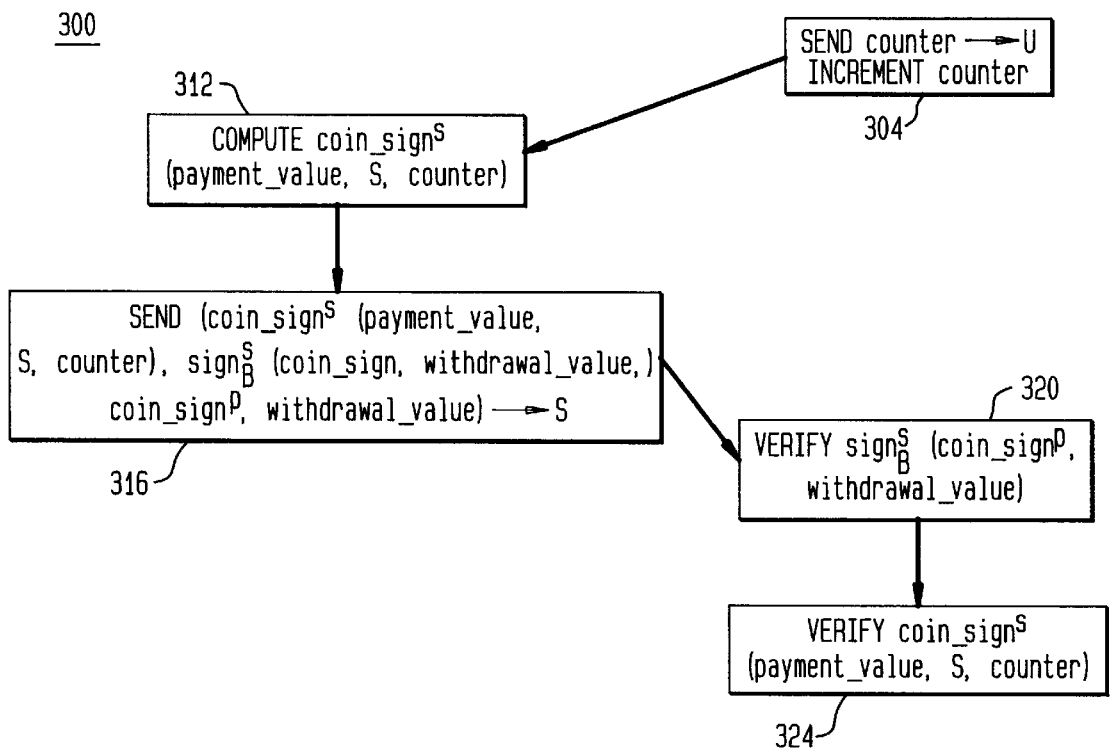
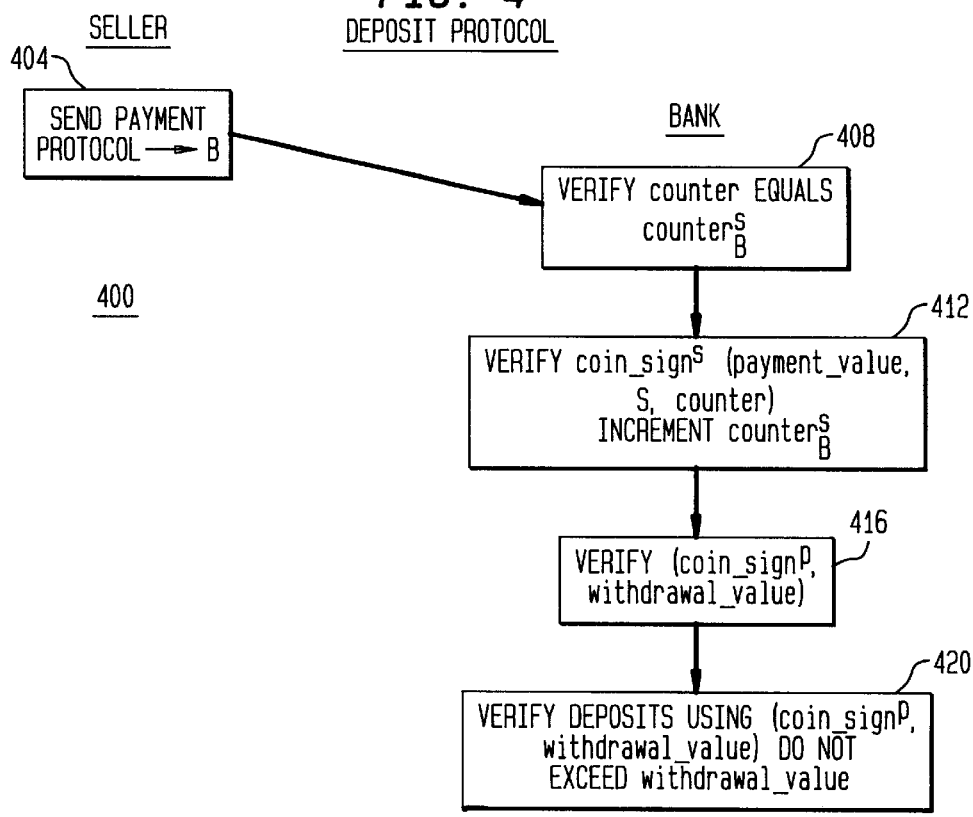

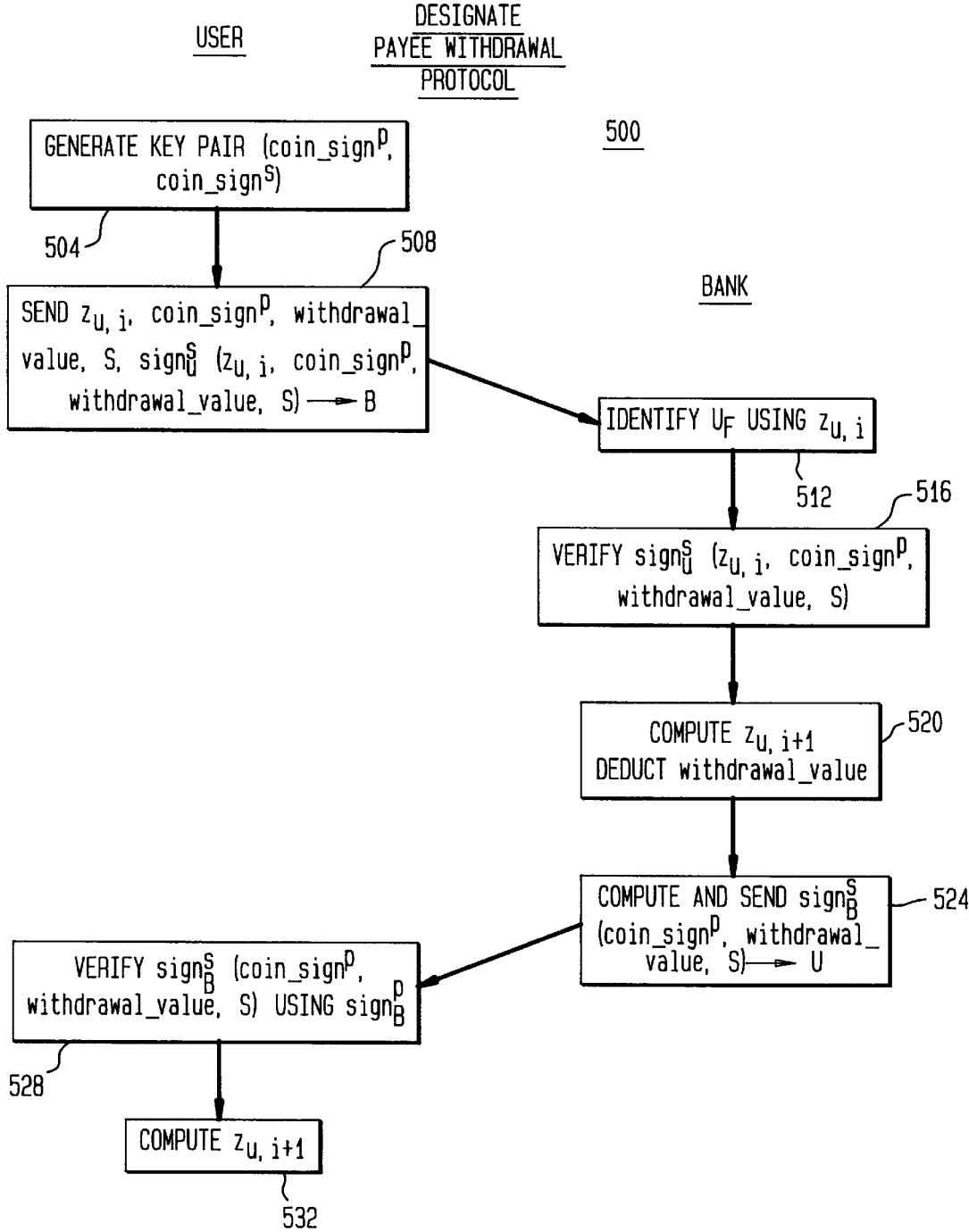

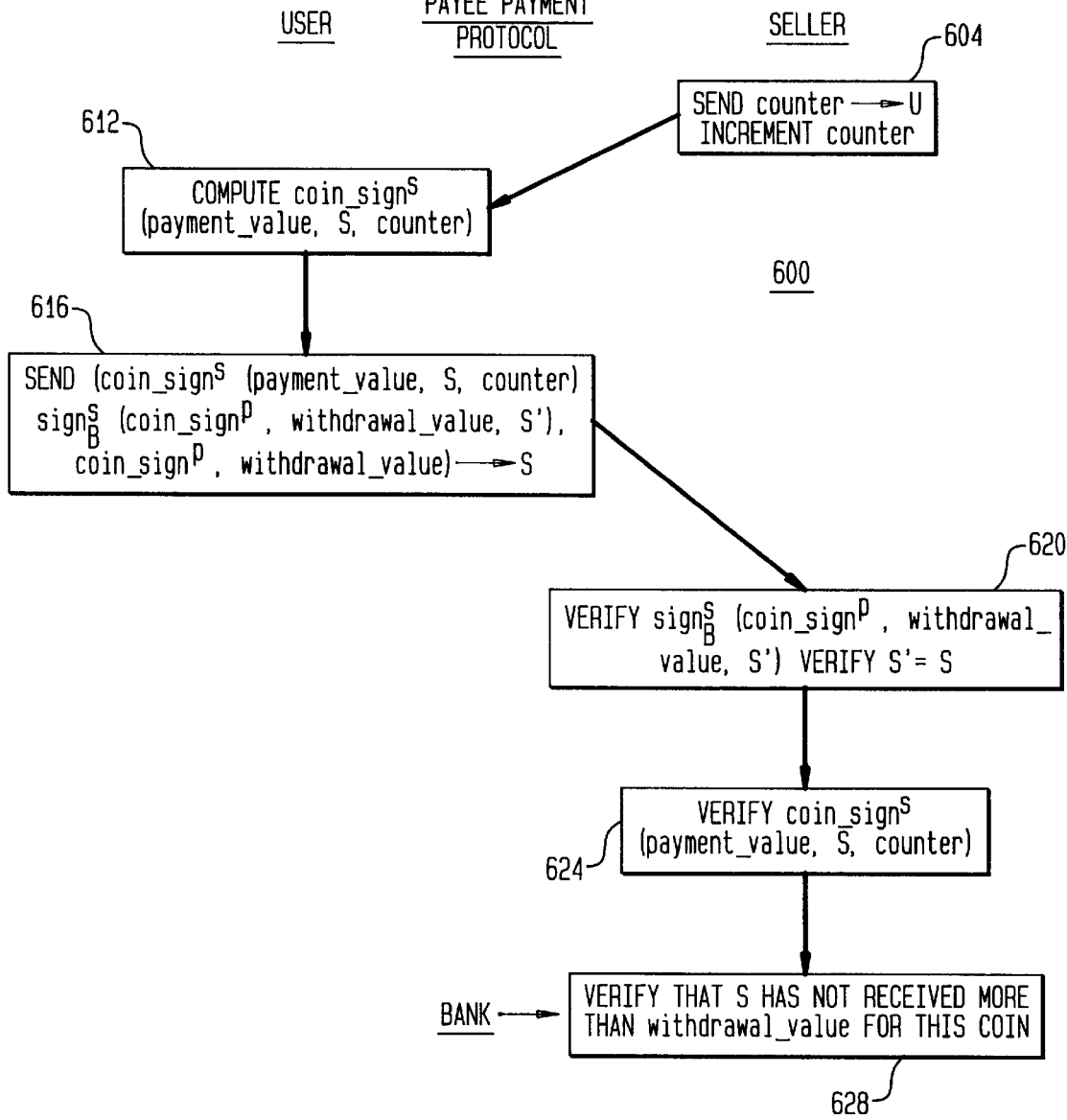

TRUSTEE-BASED WITHDRAWAL PROTOCOL

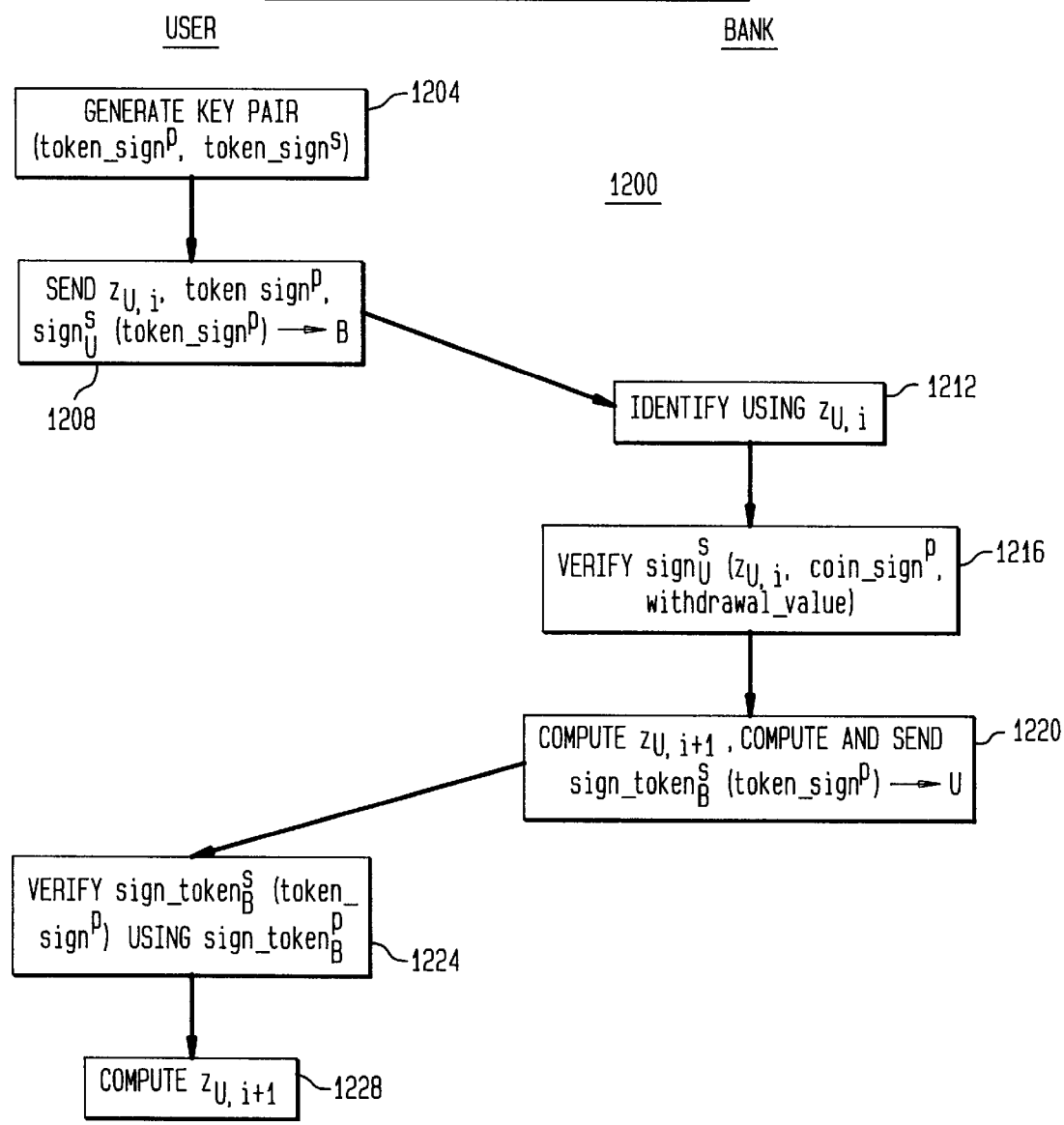

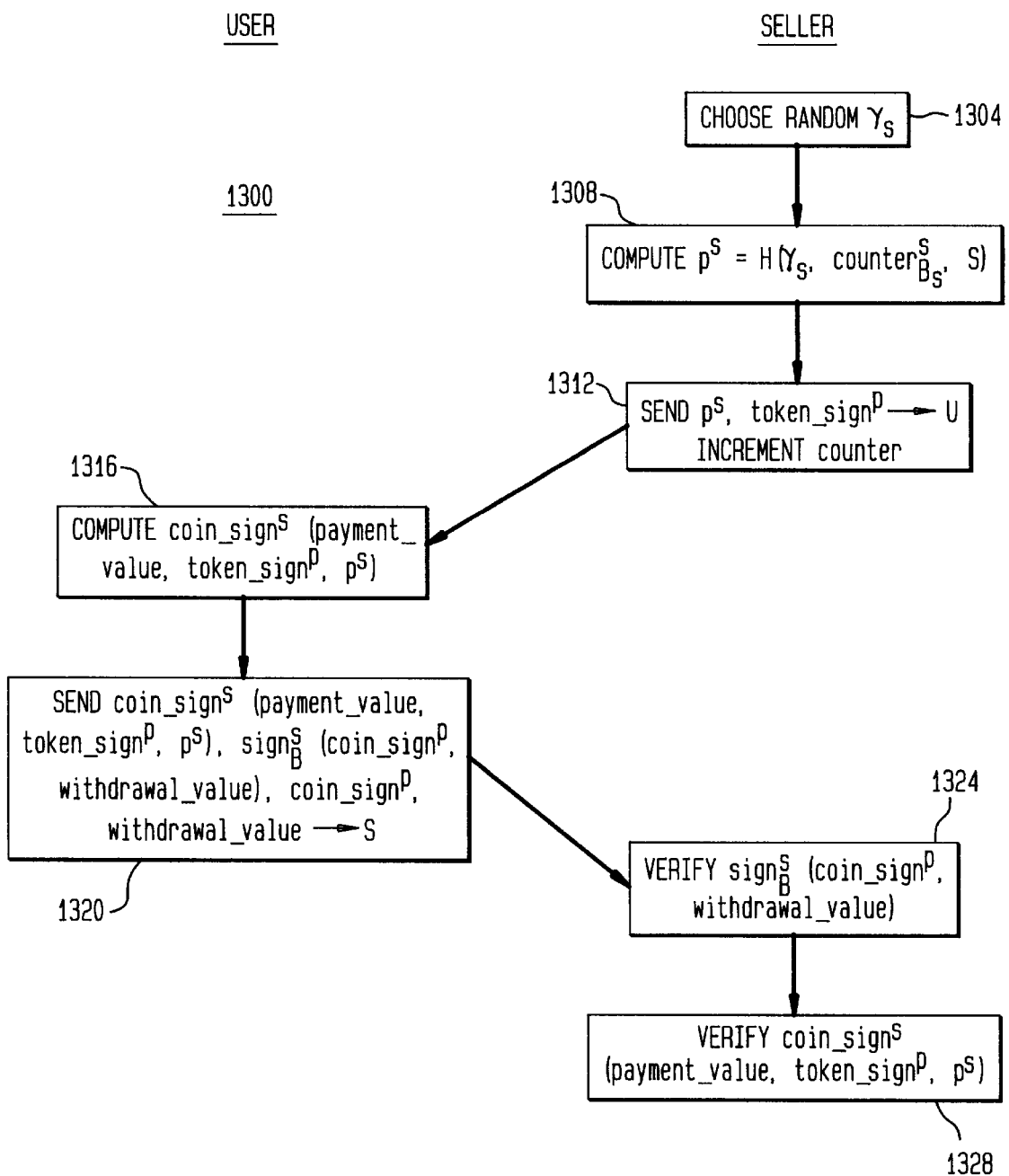

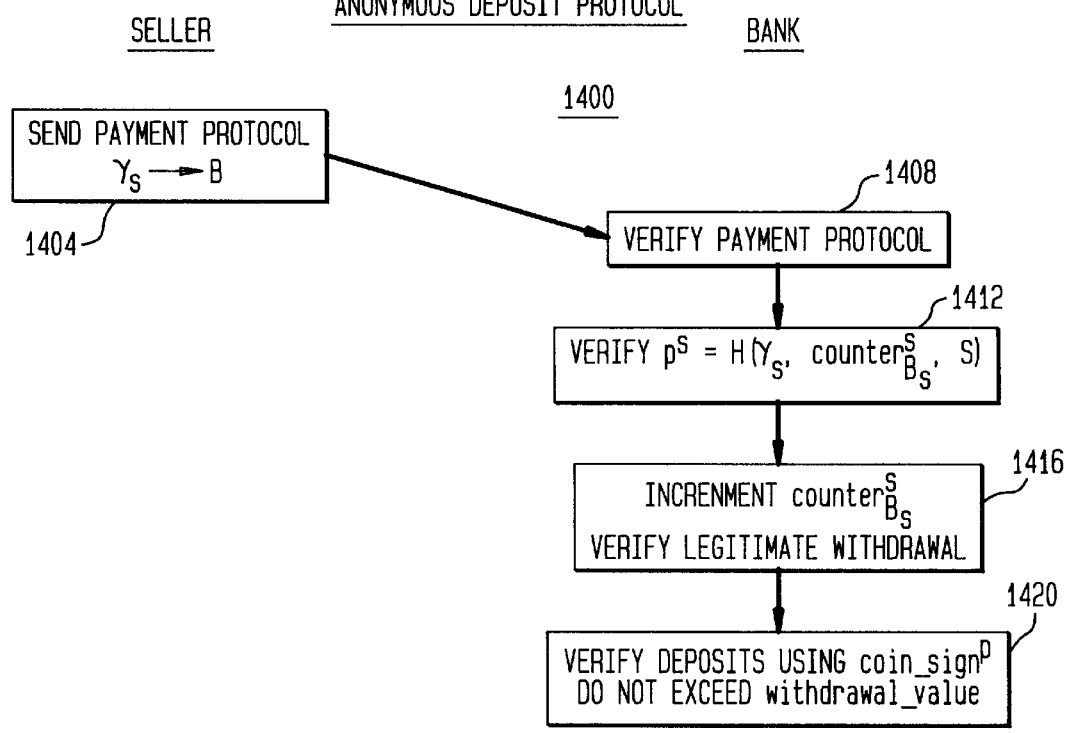
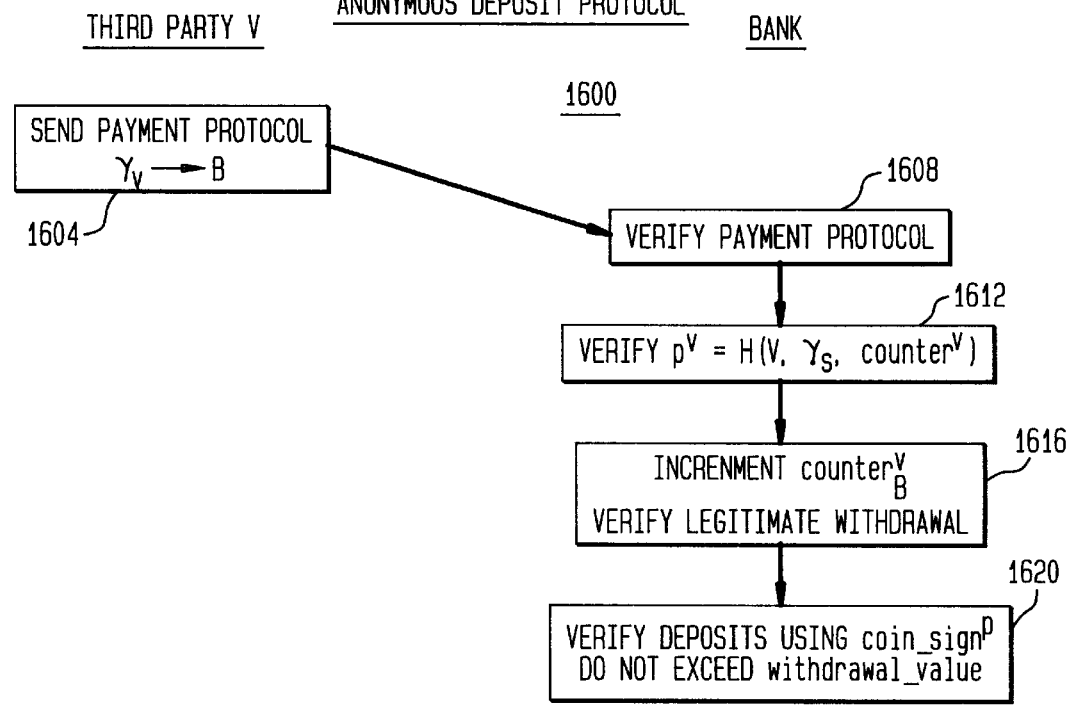

ANONYMOUS TRANSFER PROTOCOL

OFF-LINE COMPATIBLE ELECTRONIC CASH METHOD AND SYSTEM

This invention was made with Government support under Contract No. DE-AC04-94AL85000 awarded by the United States Department of Energy. The Government has certain rights n the invention.

FIELD OF THE INVENTION

This invention relates to the field of electronic transactions and, in particular, to the field of electronic transactions related to electronic cash.

BACKGROUND OF THE INVENTION

This application is related to copending U.S. patent application Ser. No. 08/482,356 filed Jun. 7, 1995.

Electronic cash is a subject of great economic, political and research importance. With advances in computer networks, processor speed and databases, electronic cash systems and methods are likely to become widespread within five to ten years. Other factors likely to lead to more widespread use of electronic cash systems and methods are advances in note counterfeiting technology and the desire of both individuals and businesses for remote and more convenient financial transactions. Electronic cash systems and methods meeting these needs must make a trade-off between privacy and a number of other considerations.

Systems and methods which provide unconditional privacy and anonymity to a payer within an electronic financial transaction are known in the prior art. However, governmental and financial institutions are unwilling to back a completely anonymous system. The reasons for opposing unconditional anonymity, and therefore untraceability, include limiting the amount of user fraud, the desire to restrict new kinds of crime that unrestricted remotely withdrawable and spendable electronic cash would facilitate, and the desire to minimize system complexity and maximize system efficiency. Thus some electronic systems and methods offer little privacy for users. These systems either neglect the privacy issue altogether or trust the banks, the government, or other central authority not to pry into the financial dealings of the users.

Other systems provide much more protection and privacy. However, these systems tend to be more difficult to design because they must prevent the bank from learning too much about the users while still giving the bank the power to prevent or detect fraud by the users. One such system is a blind signature system taught in D. Chaum, "Blind Signatures For Untraceable Payments," *Advances in Cryptology—Proceedings of CRYPTO* 82, (1983), pp. 199–203. A blind signature scheme such as the one taught by Chaum in the above-referenced article is a protocol in which the signer signs a piece of information for a user without being aware of the message for which it is providing a signature. The signer may be a bank or a minting facility. The recipient of the signature in this scheme does not learn anything from the protocol which would enable this user to sign other information. This type of signature scheme, when used in the context of electronic cash, enables the user of these systems to withdraw money from the bank and spend it with a payee. Furthermore, the payer in these systems may be confident that when the payee deposits the money at the bank, the bank is not able to recognize the money as the same cash withdrawn by the payer.

Other systems which teach blind signature schemes of this nature are disclosed in D. Chaum, A. Fiat and M. Naor, "Untraceable Electronic Cash," *Advances in Cryptology—Proceedings of CRYPTO* 88, (1990), pp. 319–327, as well as in T. Okamoto and K. Ohta, "Universal Electronic Cash," *Advances in Cryptology Proceedings of CRYPTO* 91, (1992), pp. 324–337, Stephan Brands, "Electronic Cash Systems Based on the Representation Problem in Groups of Prime Order," *Preproceedings of CRYPTO*, (1993), and M. Franklin and M. Yung, "Towards Provably Secure Efficient Electronic Cash," Columbia University, Department of Computer Science, T. R. CUCS-018-92, Apr. 24, 1992. Another blind signature scheme may be found in D. Chaum and T. P. Pedersen, "Wallet Databases With Observers," *Advances In Cryptology—Proceedings of CRYPTO* 92, (1993), pp. 89–105. Another blind signature scheme of this nature may be found in D. Chaum, "Security Without Identification: Transactions To Make Big Brother Obsolete," *Comm. ACM* 28, (October. 1985), p. 10. A further blind signature protocol of this type known in the prior art is taught in D. Chaum, *Privacy Protected Payments: Unconditional Payer and/or Payee Untraceability*, (North Holland, SmartCard 2000, 1988).

It is also known to provide an electronic cash protocol based upon the difficulty of computing cube roots, or more generally kth roots, modulo an RSA modulus with unknown factorization. In this type of blind signature protocol a bank knows the factorization of a modulus N and is able to compute $y^{1/k}$ mod N given arbitrary y, where k is relatively prime to $\phi(N)$. Given a collision-free one-way hash function H, the user chooses random x, r mod N and sends $r^k H(x)$ mod N to the bank. The bank then sends r $H(x)^{1/k}$ mod N to the user who extracts the electronic coin (x, $H(x)^{1/k}$ mod N), using its knowledge of x and r. The extracted electronic coin is therefore unknown to the bank, in the sense that it cannot be associated with $r^k H(x)$ mod N.

Techniques proposed in the prior art for dealing with the problem of anonymously providing change in electronic cash systems may be found in T. Okamoto and K. Ohta, "Universal Electronic Cash," *Advances in Cryptology-Proceedings of CRYPTO* 91, (1992), pp. 324–337 as well as in T. Eng and T. Okamoto, "Single Term Divisible Electronic Coins," *Preproceedings of Buroerypt* 94, (1994), pp. 311–323. Electronic cash systems of this type prevent the bank from determining which user withdrew an electronic coin. However, in these systems the banks are able to recognize different pieces of a coin as belonging to the same coin. Thus the pieces of the coin are linkable by the bank.

It is therefore desirable to provide an electronic cash system and method that adequately protects the identity of a user, i.e., payer, from a payee in an electronic financial transaction. Furthermore, it would be desirable to be able to require that the banks that issue and accept the deposit of the electronic coins can cooperate with each other in order to trace the electronic coins, in the case that the two banks are distinct. Regarding trustee traceability, there should be a trustee system in which a coin minter and the bank of the user of the electronic coins are among the trustees. Such a system should provide payer anonymity with minimal system complexity, storage space, bandwidth and processing demands.

In off-line electronic cash transaction systems it is often desirable to allow the user of an electronic coin to designate an individual identified payee to enable payment of the coin directed only to the designated payee. This feature allows a user to make an off-line purchase in such a way that the recipient is assured that the electronic cash is not already overspent. Furthermore, the recipient of the coin can determine that the electronic cash is not already overspent without conferring with the bank which issued it to the user. Thus, payment involving electronic cash meeting these criteria is only valid with the designated recipient in systems of this nature.

Additionally, when electronic coins are deposited by a payee with the issuing bank, the bank would like to be able to determine that the coin is not overspent or counterfeit. In order to do this it is known for the bank to maintain exhaustive lists of the coins which it has issued. Upon receiving a deposit of an electronic coin the bank may compare the received deposit with the list of issued coins. If the received coin is on the list and is not overspent, the bank may make payment on it.

When it is determined that a coin is fully spent the bank which issued the coin would like to delete it from the list in order to avoid accumulating large numbers of records of spent coins. Such accumulated records require valuable memory space in the database maintained by the bank. However, when such coins are deleted from the database the bank is unable to determine to whom the coins were issued if they are later redeposited as part of an overspending or fraud attempt, or at least unable to prove fraud. The bank must therefore establish a trade-off between its ability to take anti-fraud measures and the memory space required to store spent electronic coins. Thus, it would be useful to be able to determine information such as the identity of the user to whom a fraudulently spent coin was originally issued. Furthermore, it is preferred that this information can be determined without requiring excessive computer memory space.

One known cash system, as provided in the prior art by Rosen, is non-anonymous and transactions are linkable. This system is taught in European Patent Application No. 0 542 298 A2 entitled Electronic Monetary System. Another known system in the prior art is NetCash provided by Medvinsky and Neuman, *Proceedings of the First ACM Conference on Computer and Communications Security*, (November 1993). Multiple trustees, or servers, are required for tracing transactions in the system taught by Medvinsky and Neuman in order to provide a measure of anonymity for users. The "trusted" server is chosen by the exchanging user.

In the system of medvinsky and Neuman, as money is exchanged through multiple cash servers the number of trustees is increased because all of the servers must collaborate in order to follow the path of the money. In this system, each of the trustees must have the power to mint money. As long as a user only presents an electronic coin to a currency server, the server should not be aware of the identity of the user. The designers of this system do not intend that these servers legally collaborate in order to trace user identities. Furthermore, honest servers are expected not to retain records that link or pair accepted and issued coins. If these constraints are followed it should not be possible to trace the coins. However, it is undesirable to require a number of trustees with the power to mint since it is better to have fewer minters.

In order to enable mutual protection of the payor and payee from a fraudulent exchange, the Medvinsky-Neuman system provides for a coin which contains both a payee-coin and a payor-coin.

The Medvinsky-Neuman system provides a payee-coin to prevent over-spending by a user (payor). The payee-coin is only accepted by a designated payee since only the designated payee can prove to the server that it holds a valid coin. The user cannot convert the payee-coin to another coin and later accept a receipt for unpaid merchandise. The payee-coin may incorporate a one-time public key chosen by the payee. However, the resulting receipt is meaningless in this system because it is not associated with the actual payee in an adjudicatable manner.

A payor-coin is also provided in the system of Medvinsky and Neuman. The payor-coin prevents someone other than the payor from spending the coin or receiving a receipt for merchandise. Even the cash server cannot spend the payor-coin. The public key used with the payor-coin can be chosen for an individual coin by the payor when the payor purchases the coin. This protects the identity of the payor from the payee when later presenting the receipt. It also protects the identity of the payor from the server when purchasing a coin with another anonymous coin.

The system taught by Medvinsky and Neuman is heavily reliant upon encryption. It uses encryption in all protocols. This is undesirable because encryption requires extra memory space and processing time. Another known prior art system, as proposed by Chaum, partially solves this problem. This Chaum system provides a user with protection against framing and tracing using information-theoretic and complexity-theoretic techniques.

However, this Chaum system has problems with fungibility, where fungibility is understood to be the ability to make change. In the most basic system proposed by Chaum each electronic coin has a value of a predetermined denomination wherein the denomination is determined by the minting key of the issuing bank. Much like present-day physical coins these electronic coins cannot be broken into smaller pieces. Instead, the user must have correct change or the payee must provide correct change. The system of Chaum provides techniques to allow the user to break the coin down into smaller pieces. However, these techniques greatly increase the computation time required by the software of the user.

The reasons for this complexity are the aspects of this Chaum system that keep the spending of the user private even from the bank. This is very inconvenient and it is therefore desirable to have an electronic cash system wherein electronic coins may be easily broken down into smaller pieces of arbitrary value with a small amount of overhead computation, thereby providing no difficulty with respect to fungibility. This Chaum system also has rather complex coding requirements. A large amount of computation is required by the user. For example, in order to withdraw one non-fungible coin a user must perform at least ten modular exponentiations involving a base and exponent that are numbers of about 800 bits each. Additionally, the application of a one-way hash function is also required in this system. A withdrawal of $100 that is fungible would require at least one hundred applications of one-way hash functions. It is desirable that code speeds which are significantly higher than this be available if the system is to be convenient to use.

Additionally, electronic coins within the system proposed by Chaum require a significant amount of space. For example, in a system based upon the representation of elements of a group of prime order, a single coin may be represented by at least seven numbers of about 800 bits each. Thus a single coin may require at least 5600 bits. Due to the lack of fungibility, several coins of this size may be required to meet the needs of the user which may be met by a single more fungible coin. The space required by the coins is important to both the user and the banks. High storage requirements for the user may limit the ability of the user to benefit from the system. High storage requirements for the bank may mean, among other things, that searches to determine overspending of electronic coins are slower. The same factors leading to large space requirements cause a taxing of the communication bandwidth available to users of the system.

In the system disclosed by Chaum, the banks are unable to differentiate between electronic coins that are legitimately withdrawn from the bank and coins created by criminals using the minting key. As long as the value of forged coins remains low relative to the amount of legitimate money in circulation, the banks are unable to determine that there is a problem, if the acquisition of the minting key value by criminals was surreptitious. Even if the value of the forged coins that are deposited becomes high, the bank may only be aware that some unknown party has created forged coins. It may still be unable to distinguish between the forged and legitimate coins.

Therefore, if the minting key is compromised there is potential for discrediting the system and for serious financial losses on the part of the banks. The reason for the difficulty in detecting the forged coins is that the banks do not know which coins have been legitimately withdrawn. This is an unavoidable consequence of unconditional anonymity. Thus, it is desirable to provide a system wherein banks are able to identify and reject money that is created with a stolen minting key immediately upon an attempt to deposit the money, while still permitting a significant amount of user anonymity and not imposing excessive memory requirements.

Other problems exist in known electronic cash systems and methods. For example, in an electronic cash system and method which is software-based on the user end, the potential exists for the creation and widespread dissemination of defeating software. The defeating software may reconfigure or replace the authorized software in order to enable cheating. A particular goal of such spoofing may be to enable overspending of electronic cash. Banks must be cognizant of the possibility that such reverse-engineering of software could enable an individual to produce a large number of electronic coins which are not backed by funds actually on deposit with the bank. These fraudulent electronic coins could also be distributed across networks as a malicious hacking exercise in addition to or as an alternative to an attempt to steal money from the system.

SUMMARY OF THE INVENTION

An off-line electronic cash system having an electronic coin, a bank B, a payee S, and a user U with an account at the bank B as well as a user password $z_j$, is provided with a method for performing an electronic cash transfer. In the electronic cash transfer an electronic coin is withdrawn from the bank B by the user U and an electronic record of the electronic coin is stored by the bank B. The electronic coin is paid to the payee S by the user U and the payee S deposits the electronic coin with the bank B. A determination is made that the electronic coin is spent in accordance with the deposit and the record of the electronic coin is deleted by the bank B in response thereto. A further deposit of the same electronic coin after the electronic record is deleted is determined. Additionally, a determination may be made which user U originally withdrew the electronic coin after the record is deleted.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1 is a flow chart representation of a setup protocol suitable for use in the electronic cash system and method of the present invention;

FIG. 2 is a flow chart representation of an electronic cash withdrawal protocol suitable for use in the electronic cash system and method of the present invention;

FIG. 3 is a flow chart representation of an electronic payment protocol suitable for use in the electronic cash system and method of the present invention;

FIG. 4 is a flow chart representation of an electronic deposit protocol suitable for use in the electronic cash system and method of the present invention;

FIG. 5 is a flow chart representation of an electronic withdrawal protocol adapted for use with a designated payee within the electronic cash system and method of the present invention;

FIG. 6 is a flow chart representation of an electronic payment protocol adapted for use only with a designated payee within the electronic cash system and method of the present invention;

FIG. 12 is a flow chart representation of an electronic withdrawal protocol adapted for the anonymous transfer of an electronic coin using encryption and suitable for use within the electronic cash system and method of the present invention;

FIG. 13 is a flow chart representation of an electronic payment protocol adapted for the anonymous transfer of an electronic coin using encryption and suitable for use within the electronic cash system and method of the present invention;

FIG. 14 is a flow chart representation of an electronic deposit protocol adapted for the anonymous transfer of an electronic coin using encryption and suitable for use within the electronic cash system and method of the present invention;

FIG. 16 is a flow chart representation of an electronic deposit protocol suitable for use by a third party and suitable for use within the electronic cash system and method of the present invention.

DETAILED DESCRIPTION OF THE PREFERRED EMBODIMENT

Figure 7:
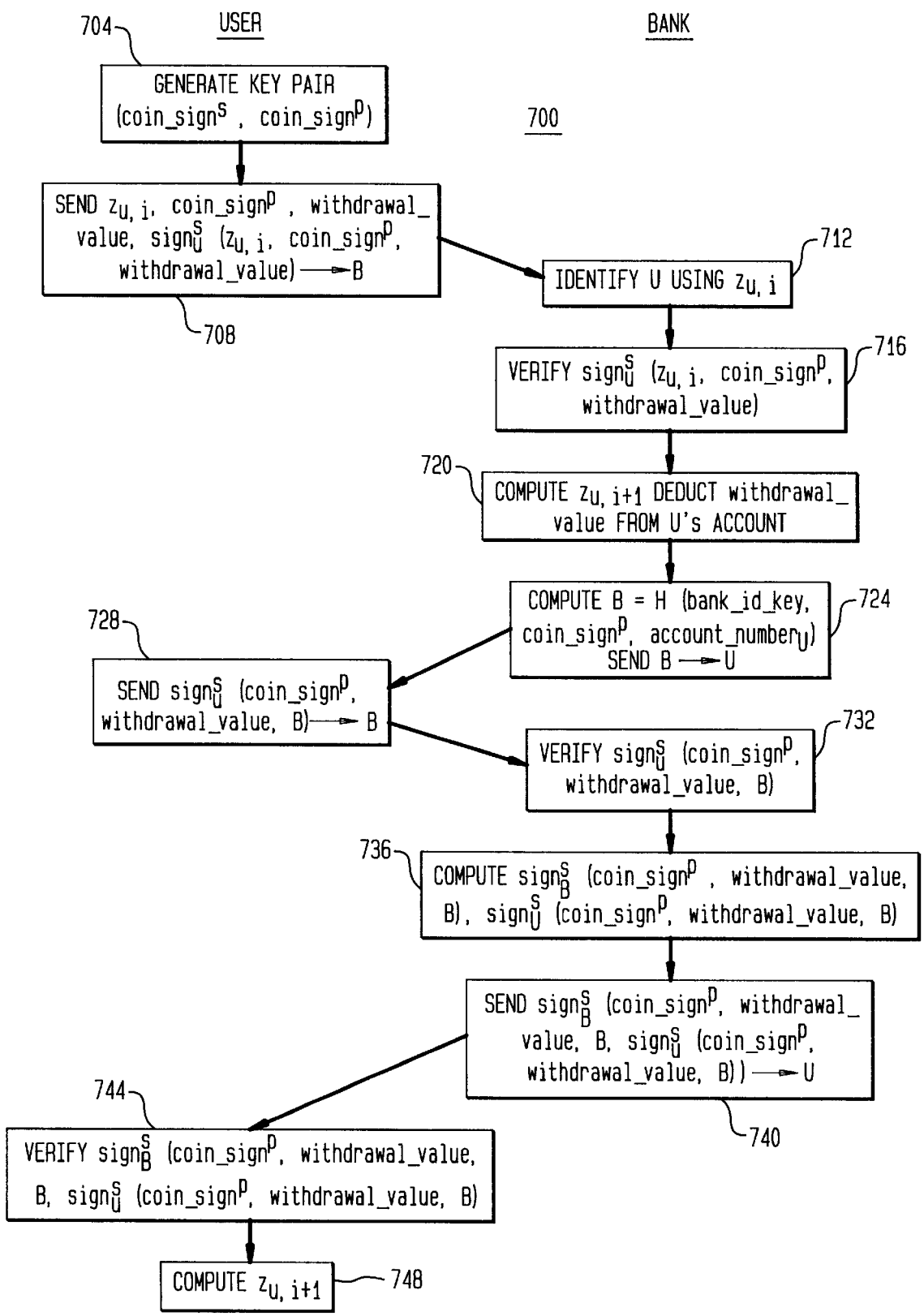
FIG. 7 is a flow chart representation of an electronic withdrawal protocol adapted to permit tracing of a user by encoding information within the electronic coin within the electronic cash system and method of the present invention.

Referring now to the drawings, wherein like numerals are used to indicate like elements throughout the several figures, there is shown in FIG. 1 the electronic cash setup protocol 100 for use in a presently preferred embodiment of an electronic cash system in accordance with the present invention. It should be appreciated by those skilled in the art that while a financial-based transaction system is shown and described herein the present invention is not limited to financial-based transaction systems. It will be understood that the present invention encompasses other non-financial transaction systems including, but not limited to, identification or access control systems and voting systems.

It will also be understood that all values which are digitally signed in the present invention are preprocessed in the system and method of the present invention using appropriate redundancy and/or one-way hash functions in a manner understood by those skilled in the art. Although both the messages and their digital signatures are transmitted in the instant description, it will be understood that in some cases this may be unnecessary. For example, it is not necessary to transmit both a message and its digital signature when the message is recoverable from its digital signature.

SETUP PROTOCOL

In the electronic cash setup protocol 100 the user U is any user entity which later withdraws and spends electronic cash and the bank B is any bank or other entity from which the user U withdraws the electronic cash. The seller S or payee S is any seller or payee entity which receives the electronic cash from the user U and deposits the received electronic cash at a bank entity such as the bank B in later protocols described hereinbelow. It is assumed in the electronic cash setup protocol 100 that the user U and the bank B have a line of secure private communication for the proper functioning of the later withdrawal procedure described hereinbelow. This feature is important in order to minimize the use of encryption within the system of the present invention and thereby avoid the computation requirements associated with encryption. As described in detail hereinbelow the secrecy of the public signature key of the user U is relied upon to keep transactions of the user U anonymous in the present invention.

In the electronic cash setup protocol 100 the user U of the electronic cash system of the present invention obtains the required software and provides a user identification to the bank B as shown in block 104. In response to the transmission of block 104 the bank B provides a system identification, account_number$_u$, to the user U as shown in block 108. The system identification account_number$_u$ of block 108 may later be used in the anti-fraud operations of the electronic cash system if the user U attempts to overspend the electronic cash withdrawn from the bank B. In the preferred embodiment of the invention the system identification value, account_number$_u$, transmitted in block 108 may also serve as the bank account number of the user U. Thus, if the user U sets up other bank accounts, for example at different banks, then the user U may acquire other identifications of this type.

In block 108 of the electronic cash setup protocol 100 the bank B also provides the user U with the bank public signature key sign$^P_B$. It will be understood however that in an alternate embodiment the public signature key sign$^P_B$ may also be provided to the user U by the software the user U acquires. The value of sign$^P_B$ transmitted by the bank B in block 108 may be used later to verify that the information had been signed by the bank B. Additionally, the user U may use the public signature key sign$^P_B$ to identify the bank B and to verify messages transmitted by the bank B.

In block 112 the public signature key sign$^P_B$ is verified by the user U by comparing it with the public signature key sign$^P_B$. The public signature key sign$^P_B$ is received by the user U in the software of block 104. If the public signature key sign$^P_B$ of the bank B is verified in this manner, the user U sends its own public signature key, sign$^P_u$. The public signature key sign$^P_u$ of the user U corresponds to the secret key, sign$^s_u$, of the user U which is also received by the user U in the software of block 104 or is generated using such software. This transmission of its public signature key sign$^P_u$ by the user U is shown in block 116 of the setup protocol 100. In block 120 the bank B stores the identification of the user U, account_number$_u$, and sign$^P_u$ into its database.

WITHDRAWAL PROTOCOL

Referring now to FIG. 2, there is shown a flow chart representation of the electronic cash withdrawal protocol 200 of the present invention. The electronic cash withdrawal protocol 200 is a method for permitting the user U to withdraw electronic cash from the bank B. The preferred embodiment of the electronic cash system and method of the present invention is based upon electronic coins which are represented, at least in part, by digital signature key pairs. In the preferred embodiment the electronic coins are of the form (coin_sign$^P$,coin_sign$^s$) wherein the key coin_sign$^P$ is a public coin signing key of the user U. The key coin_sign$^s$ is a secret coin signing key of the user U corresponding to the public coin signing key coin_sign$^P$.

Therefore, in the electronic cash withdrawal protocol 200 of the present invention the user U which is withdrawing an electronic coin from the bank B randomly or pseudorandomly generates a digital signature key pair (coin_sign$^P$, coin_sign$_s$) as shown in block 204. It will be understood by those skilled in the art that any known method of providing digital signature key pairs may be used. For example the Digital Signature Algorithm, DSA, of the Digital Signature Standard, DSS, or RSA may be used to generate the signature key pairs of block 204.

In block 208 of the electronic cash withdrawal protocol 200 the user U transmits a copy of the public key coin_sign$^P$, its user password $z_{u,i}$, and withdrawal_value to the bank B. It will be understood that withdrawal_value is the amount of electronic cash that the user U wishes to withdraw from the bank B with respect to a single fungible coin of the form (coin_sign$^P$,coin_sign$^s$). The values transmitted by the user U in block 208 are signed by the user U with the long-term user secret key sign$^s_u$. In order to ensure that no one else can spend the electronic coin being withdrawn the user U never reveals the secret key coin_sign$^s$.

In one embodiment of the present invention the bank B maintains lists of all electronic coins withdrawn and all electronic coins deposited. The bank B can therefore check that no legitimate electronic coin is being spent beyond the maximum value, withdrawal_value, transmitted in block 206. Using these lists the bank B can also determine that no counterfeit coins are being introduced into the system in case the signature key of the bank B is compromised. However, embodiments of the present invention maintaining lists of this type require a large amount of computer memory storage in order to maintain records of all such electronic coins.

In block 212 the bank B identifies the user U by looking up the user password $z_{u,i}$ in its database. In block 216 the bank B verifies the user transmissions of block 208. In the preferred embodiment of the invention the user password $z_{u,i}$ is an indexed password. Therefore, as shown in block 220, the bank B independently computes the next value of the user password, $z_{u,i+1}$, and deducts the amount of the withdrawal from the bank account of the user U. The bank B signs the public key coin_sign$^P$ as well as the coin value withdrawal_value as shown in block 224 using its secret key sign$^s_B$. This later permits the payee S to recognize the electronic coin as valid currency with a maximum value withdrawal_value when it receives the coin from the user U. In block 228 the user U verifies the transmission of block 224 using sign$^P_B$. The user U then updates the user password $z_{u,i}$ to obtain the next password $z_{u,i+1}$ as shown in block 232 independently of the bank B.

It will be understood by those skilled in the art that in the electronic cash withdrawal protocol 200 all messages may be sent in the clear and the user U may thus identify itself to the bank B without using traditional encryption methods. Therefore much less computation is required for the user U to send the password $z_{u,i}$ in the first round as shown in block 208. Additionally much less computation is required for the bank B to look up the user password $z_{u,i}$ in its database as shown in block 212 in order to determine to whom the password $z_{u,i}$ corresponds. Because there is randomization in the signature scheme performed by the user U with respect to sign$^s_u$, the signing of messages by the user U does not reveal its identity.

PAYMENT PROTOCOL

Referring now to FIG. 3, there is shown the electronic cash payment protocol 300 of the present invention. Prior to payment of the electronic cash amount payment_value to a payee S by the user U the payee S sends a value, counter, as a challenge to the user U. The payee challenge is shown in block 304 of the payment protocol 300. In block 304 counter is also updated by the payee S after transmission to the user U in order to provide a unique value for each challenge. The purpose of the challenge by the payee S is to prevent replay attacks wherein a user U can resend a transaction to a payee S or wherein a payee S can resend a transaction to a bank B. Another attack prevented by the payee challenge of block 304 could come from an eavesdropper who could try to replay the same conversation with the payee S to illegally acquire goods from the payee S. The eavesdropper in this case may operate without the knowledge of the user U.

In block 312 of the electronic cash payment protocol 300 the user U uses its secret value of coin_sign$^s$ to compute coin_sign$^s$(payment_value,S,counter), wherein S in this context is understood to be an identification of the payee S. In block 316 the user U sends the values of withdrawal_value and coin_sign$^P$ as well as a partial representation of the electronic coin, namely, sign$^s_B$(coin_sign$^P$, withdrawal_value) signed by the bank B to the payee S. The user U also sends the signed electronic coin payment computed in block 312, coin_sign$^s$(payment_value,S,counter), which is computed over the transaction amount, the identification of the payee S, and the challenge received from the payee S. In block 320 the payee S verifies the signature of the bank B on the public part of the electronic coin and in block 324 the payee s verifies the signature of the payment of the coin which includes a verification that the embedded value S appropriately represents the payee S.

DEPOSIT PROTOCOL

Referring now to FIG. 4, there is shown the electronic cash deposit protocol 400 of the present invention. In block 404 of the electronic cash deposit protocol 400 the payee S which received an electronic payment from the user U sends a transcript of the transaction as set forth in the payment protocol 300 to the bank B. The bank B verifies that the value of the challenge counter, represented as counter, used by the payee S is correct by comparing it with its own copy, counter$^s_B$, as shown in block 402. In block 412 of the deposit protocol 400 the bank B verifies part of the transmission of block 316 by determining that the payment of the amount payment_value was made to the payee S with the challenge counter, using the coin corresponding to the secret coin signing key coin_sign$^s$. In block 416 the bank B determines that (coin_sign$^P$,withdrawal_value) was used in a legitimate withdrawal such as a withdrawal as set forth in the electronic cash withdrawal protocol 200 hereinabove. The bank B also verifies that the sum of the deposits using (coin_sign$^P$,withdrawal_value) does not exceed the value withdrawn as shown in block 420. At some point the appropriate account of the depositor embedded within the electronic coin is adjusted to reflect the deposit made using the deposit protocol 400.

DESIGNATED PAYEE WITHDRAWAL AND PAYMENT PROTOCOLS

Referring now to FIG. 5, there is shown the designated payee withdrawal protocol 500 of the method and system of the present invention. The designated payee withdrawal protocol 500 may be used when a user U wants to make a purchase in such a way that the payee S can be assured without conferring with the bank B that the electronic cash used in the purchase is not overspent. The designated payee withdrawal protocol 500 requires the identity of the payee S to be encoded or embedded in an electronic coin withdrawn from the bank B and signed by the bank B. Payments involving electronic cash obtained using the withdrawal protocol 500 are then only valid with the designated payee S. Therefore the electronic coin may be referred to as a directed electronic coin. The setup protocol required prior to the operation of the designated payee withdrawal protocol 500 may be the same as the electronic cash setup protocol 100 used in connection with the withdrawal protocol 200 wherein the electronic cash withdrawn could be used with any payee S.

In the designated payee withdrawal protocol 500 the user U withdrawing an electronic coin from the bank B randomly generates a digital signature key pair (coin_sign$^P$,coin_sign$^s$) as shown in block 504. It will be understood by those skilled in the art that any known method of providing digital signature key pairs may be used in block 504 to generate a digital signature key pair as previously described with respect to block 204. In the preferred embodiment DSA may be used.

In block 508 the user U transmits the user password $z_{u,i}$, a copy of the public key coin_sign$^P$, withdrawal_value and the value S which is a representation of the payee S. The value withdrawal_value is the amount of electronic cash the user U wishes to withdraw from the bank B with respect to the coin of the form (coin_sign$^P$,coin_sign$^s$). It will be understood that it is the inclusion of the identification of the payee S within the electronic coin in the manner set forth in block 508 that creates the ability to provide a designated payee electronic coin The values transmitted by the user U in block 508, including the representation of the designated payee S, are signed by the user U using the user secret key, sign$^s{}_u$. In order to ensure that no one else can spend the electronic coin being withdrawn the user U never reveals the secret key coin_sign$^s$.

In block 512 the bank B identifies the user U by looking up the user password $z_{u,i}$ in its database. In block 516 the bank B verifies the user transmissions of block 508. In the preferred embodiment of the invention the user password $z_{u,i}$ is an indexed password. Therefore, as shown in block 520, the bank B independently computes the next value of the user password, $z_{u,i+1}$. The bank B then deducts the amount of the withdrawal from the bank account of the user U. The bank B signs the public key coin_sign$^P$ as well as the monetary value of the electronic coin, withdrawal_value, and the representation of the designated payee S as shown in is block 524. The signing of these values by the bank B is performed using its secret key sign$^s{}_B$ so that later the payee S can recognize the electronic coin as valid currency when it receives the electronic coin from the user U. In block 528 the user U verifies the transmission of block 524 using sign$^P{}_B$. The user U then updates the user password $z_{u,i}$ to obtain the next user password $z_{u,i+1}$ as shown in block 532. The update performed by the user U in block 532 is independent of the bank B.

It will be understood by those skilled in the art that in the electronic cash withdrawal protocol 500 all messages may be sent in the clear and that the user U may thus identify itself to the bank B without using encryption. Therefore much less computation time is required for the user U to send the user password $z_{u,i}$ in the first round as shown in block 508. Additionally, much less computation time is required for the bank B to look up the user password $z_{u,i}$ in its database in order to determine the party to which the password $z_{u,i}$ corresponds as shown in block 512. Because there is randomization in the signature scheme performed by the user U with respect to sign$^s{}_u$, the signing of messages by the user U does not reveal its identity within the designated payee withdrawal protocol 500 of the present invention.

Referring now to FIG. 6, there is shown the designated payee payment protocol 600 of the present invention. Using the designated payee payment protocol 600 a payee S can be certain that the user U has not used an electronic coin received from the user U to pay anyone else. The designated payee payment protocol 600 may be used in cooperation with the designated payee withdrawal protocol 500. The deposit protocol required in connection with the designated payee payment protocol 600 may be similar to the basic electronic cash deposit protocol 400 described hereinabove except that in the deposit protocol corresponding to the designated payment protocol 600 the bank B verifies that the payee S of the directed payment is the same as the payee S which is encoded or embedded within the electronic coin.

Prior to payment of the electronic cash amount payment_ value to a payee S by a user U the payee S sends a value, counter, to the user U as a payee challenge. The payee challenge is shown in block 604 of the designated payee payment protocol 600 wherein the challenge counter is updated by the payee S after transmission to the user U. The purpose of the payee challenge is to prevent replay attacks wherein a user U can resend a transaction to a payee S. Another type of replay attack prevented by the payee challenge is one in which a payee S can resend a transaction to a bank B. A further attack prevented by the payee challenge of block 604 could come from an eavesdropper who could try to replay the same conversation with the payee S to illegally acquire goods from the payee S. Such an eavesdropper may operate without the knowledge of the user U.

In block 612 of the electronic cash payment protocol 600 the user U uses its secret value of coin_sign$^s$ to compute part of the transmission, coin_sign$^s$(payment_value,S, counter). In this context S is an identification of the designated seller S or payee S as previously described with respect to the designated payee withdrawal protocol 500. In block 616 the user U sends the signed value of block 612 as well as a partial representation of the electronic coin, namely, sign$^s{}_B$(coin_sign$^P$,withdrawal_value,S) signed by the bank B, to the payee S. The user U also sends the signature of the coin, coin_sign$^s$(payment_value,S, counter) which includes the transaction amount, the identification of the payee S and the challenge received from the payee S. In block 620 the payee S verifies the signature of the bank B on the public part of the electronic coin and in block 624 the payee S verifies the signature of the electronic coin received from the user U during the purchase, and verifies that the value of S embedded in the signature of block 620 is equal to the value of S embedded in the signature of block 624 and appropriately represents the payee S. Payee S verifies that it has not received more than withdrawal_value, for the coin, in block 628.

Referring now to FIG. 7, there is shown the electronic cash withdrawal protocol 700. The electronic cash withdrawal protocol 700 is adapted to minimize the record keeping required by a bank B while permitting the bank B to control overspending and fraud. This and other objectives are realized by permitting the bank B to encode or embed predetermined information about a user U within an electronic coin withdrawn using the withdrawal protocol 700. By encoding information within an electronic coin as set forth in the withdrawal protocol 700 the bank B and no one else can trace the user U which withdraws the electronic coins.

Furthermore, using this method the bank B can perform the tracing of electronic coins without retaining records of spent coins indefinitely. Thus, when the full value of a legitimate electronic coin minted using the electronic cash withdrawal protocol 700 has been spent it may be deleted from the bank database and the bank B must maintain only a list of the currently circulating legitimate electronic coins. The ability to delete records of spent electronic coins greatly reduces the storage requirements for the bank B.

If a deleted coin is subsequently overspent the bank B can determine the identity of the user U to whom the electronic coin with embedded value $\beta$ was issued by exhaustively searching over all user account numbers to find a user account, account_number$_u$, such that $\beta$=H(bank_id_key, coin_sign$^P$,account_number$_u$), where the value coin_ sign$^P$ is derived from the coin. Parties other than the bank B cannot perform the search for the user account because they do not know the value bank_id_key. The complicity of the identified user U may be verified through its signature sign$^s{}_u$(coin_sign$^P$,withdrawal_value,$\beta$). If the bank B encounters an electronic coin with embedded value $\beta$ which is not in the database of currently circulating legitimate coins a determination is made as to whether there is a user U such that both $\beta$=H(bank_id_key,coin_sign$^P$,account_ number$_u$) and the user signature on (coin_sign$^P$, withdrawal_value,$\beta$) is valid. If there is no such user then the electronic coin is determined to be counterfeit.

The existence of a counterfeit electronic coin located in this manner may indicate that the minting key of the bank B has been compromised. If a minting key has been compromised it can then be changed. All counterfeit electronic coins minted using the compromised key can be eliminated by Setup, requiring that all electronic coins using the compromised minting key be exchanged directly with the bank B. Setup, payment and deposit protocols suitable for use with the electronic cash withdrawal protocol 700 may be substantially the same as those described hereinabove.

Therefore, in the withdrawal protocol 700 the user U withdrawing an electronic coin from the bank B randomly generates a digital signature key pair (coin_sign$^P$, coin_sign$^s$) as shown in block 704. It will be understood by those skilled in the art that any known method of providing digital signature pairs may be used for providing the key pair of block 704. In block 708 the user U transmits a copy of the public key coin_sign$^P$, its user password $z_{u,i}$, and withdrawal_value. It will be understood that withdrawal_value is the amount of electronic cash the user U wishes to withdraw from the bank B, with respect to the said coin of the form (coin_sign$^P$, coin_sign$^s$). The values transmitted by the user U in block 708 are signed by the user U with the user secret key, sign$^{su}$. In order to ensure that no one else can spend the electronic coin being withdrawn the user U never reveals the secret key coin_sign$^s$.

In block 712 the bank B identifies the user U by looking up the user password $z_{u,i}$ in its database. In block 716 the bank a verifies the user transmissions of block 708. In the preferred embodiment of the invention the user password $z_{u,i}$ is an indexed password. Therefore, as shown in block 720, the bank B independently computes the next value of the user password, $z_{u,i+1}$, and then deducts the amount of the withdrawal from the bank account of the user U. The bank B signs, in particular, the public key coin_sign$^P$ and the electronic coin value withdrawal_value as shown in block 736 using its secret key sign$^s_B$. In this manner the payee S can recognize the electronic coin as valid currency when it later receives the coin from the user U.

In block 728 the user U sends its signed values to the bank B. The bank verifies the transmission of block 728 in block 732. In block 736 the bank B, using its secret key sign$^s_B$, signs the public key coin_sign$^P$ of the user U, the withdrawal value, the result of the hash operation of block 724 and the signed transmission transmitted from the user U in block 728. The signed value set forth in block 736 is transmitted to the user U in block 740. The user U verifies this transmission in block 744 and updates the user password $z_{u,i}$ to obtain $z_{u,i+1}$ as shown in block 748 independently of the bank B.

It will be understood by those skilled in the art that when using the electronic cash withdrawal protocol 700 all messages may be sent in the clear. Furthermore, it will be understood that the user U may thus identify itself to the bank B without using traditional encryption. Therefore much less computation time is required for the user U to send the user password $z_{u,i}$ in the first round as shown in block 708. Additionally much less computation time is required for the bank B to look up the user password $z_{u,i}$ in its database in order to determine to whom the user password $z_{u,i}$ corresponds as shown in block 712. Because there is randomization in the signature scheme of the user U, with respect to sign$^s_u$, the signing of its messages by the user U does not reveal its identity.

Figure 8:
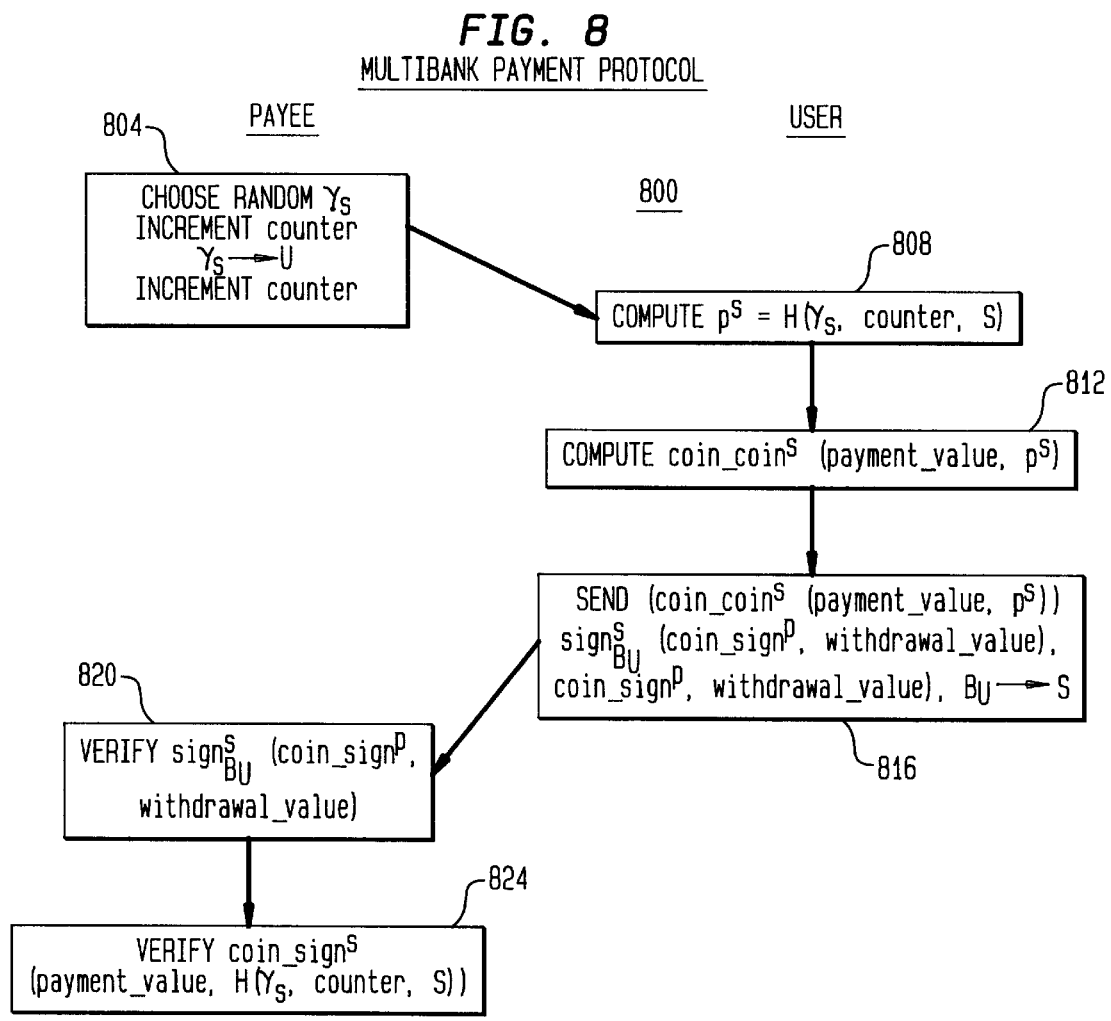
FIG. 8 is a flow chart representation of an electronic payment protocol adapted to permit a payee to identify a minting bank suitable for use with a plurality of banks within the electronic cash system and method of the present invention.
Figure 9:
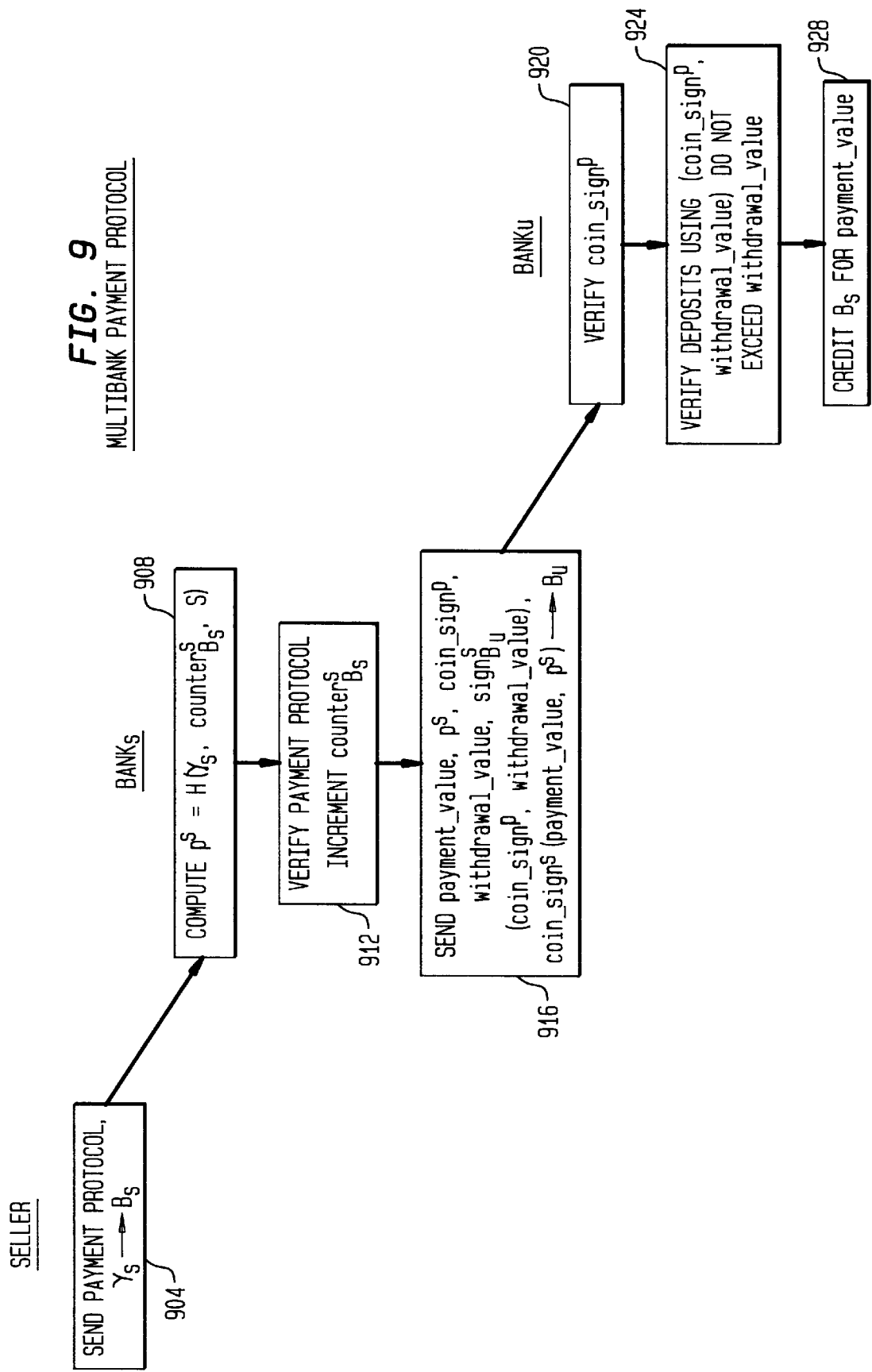
FIG. 9 is a flow chart representation of an electronic deposit protocol adapted for use with the electronic payment protocol of FIG. 8 within the electronic cash system and method of the present invention.

Referring now to FIGS. 8, 9, there are shown the multibank electronic cash payment protocol 800 and the multibank electronic cash deposit protocol 900. The two multibank electronic cash protocols 800, 900 may be used in the electronic cash system and method of the present invention when a plurality of banks are involved in an electronic cash transaction. In the multibank electronic cash protocols 800, 900 the user U is any user entity which withdraws and spends electronic cash, as described previously, and the payee S is any seller or payee entity which receives and deposits the electronic cash received from the user U. The bank $B_u$ is a bank wherein the user U has a bank account and the bank $B_s$ is a bank wherein the payee S has a bank account.

During the setup prior to a transaction involving more than one bank in the electronic cash system of the present invention, the user U may perform a basic setup protocol as set forth in the electronic cash setup protocol 100 described hereinabove. Additionally, the withdrawal protocol performed by the user U under these circumstances may be substantially the same as that set forth in the electronic cash withdrawal protocol 200 described hereinabove. One exception is that the minting key, sign$^s_{Bu}$, of the bank $B_u$ in the multibank protocols 800, 900 may be different from the minting keys of other banks. Furthermore, the multibank payment protocol 800 may be substantially similar to the electronic cash payment protocol 300 described hereinabove except that in the multibank case the user is U identifies the bank $B_u$ that minted the electronic coin so that the payee S may use the correct bank public key to verify the validity of the electronic coin it receives.

In order to execute the multibank protocols 800, 900 the payee S selects a random value $\gamma_s$ and sends it, along with the challenge counter, counter, to the user U as shown in block 804. The payee then increments the counter. The user U incorporates the identity of the seller S directly into the payment record of the electronic coin as shown in block 808 by computing the value $\rho^s = H(\gamma_s, \text{counter}, S)$ wherein S is a representation of the seller S. Due to the step set forth in block 808 it is possible to link the payment of the payment protocol 800 to the payee S only by eavesdropping on the payment or by knowing the random value $\gamma_s$. In particular, this protects the anonymity of the payee S from the issuing bank $B_u$ of the user U if the bank $B_u$ is different from the bank $B_s$ where the payee S deposits the coin. The user U then signs the payment value and the value computed in block 808 using the key coin_sign$^s$ as shown in block 812.

The payee S may already know the public signing key of the issuing bank $B_u$. If not the user U may send that key also. An expiration date may also be provided by the user U. If the user U sends the signing key in this manner it must be certified by an independent authority. As shown in block 816 the user U sends the value computed in block 812 along with a signed signal including its public key, coin_sign$^P$, the withdrawal value, withdrawal_value, and the identity of the bank $B_u$. In blocks 820, 824 the payee S verifies the transmissions of block 816 within the multibank electronic cash payment protocol 800.

In the multibank electronic cash deposit protocol 900 the payee S sends the random value $\gamma_s$ to its own bank $B_s$ as shown in block 904. The role previously performed by the single bank B is then divided between the bank $B_s$ of the depositor and the bank $B_u$ that issued the electronic coin exchanged by the user U and the payee S. These operations are set forth in blocks 908–928.

The value $\rho^s = H(\gamma_s, \text{counter}^s_{Bs}, S)$ is computed by the bank $B_s$ in block 908 and the transmission of block 904 is verified in block 912. The bank $B_s$ then transmits to the bank $B_u$ as shown in block 916. In blocks 920, 924 bank $B_u$, verifies that the payee S is the intended recipient of the electronic coin and that the payee S has not made the same deposit before. The bank $B_u$ also verifies that the electronic coin has not been overspent and that it is not counterfeit. The bank $B_u$ then credits the bank $B_s$ in block 928 for the amount payment_value if all verifications of blocks 920, 924 are performed correctly. The bank $B_s$ then credits the payee S for amount payment_value within the multibank electronic cash deposit protocol 900.

Figure 10:
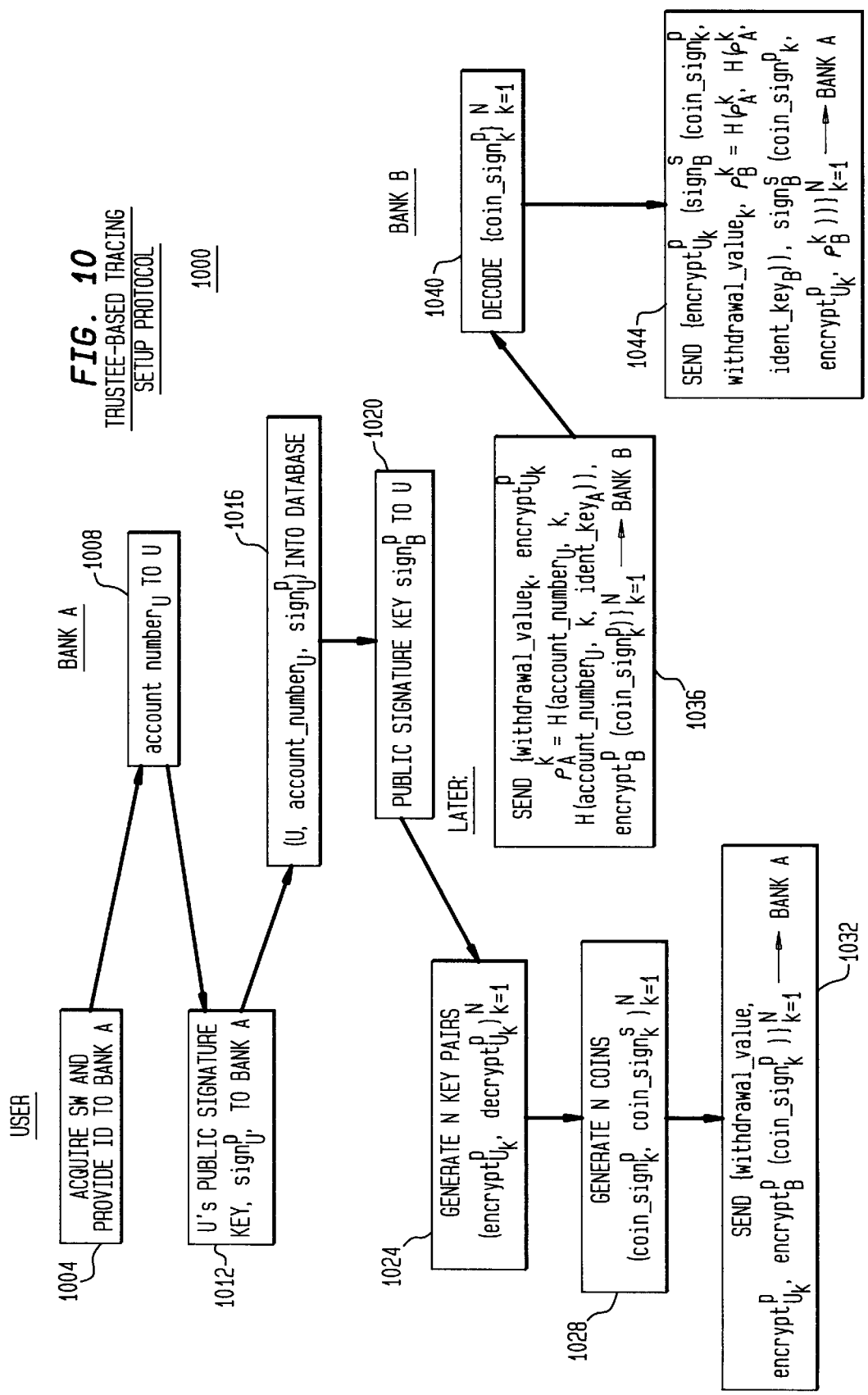
FIG. 10 is a flow chart representation of an electronic setup protocol suitable for use with a trustee system within the electronic cash system and method of the present invention.

Referring now to FIG. 10, there is shown the trustee-based tracing setup protocol 1000. In the trustee-based tracing setup protocol 1000 only one of the trustees, for example the bank B, needs the power to mint or coin electronic money. The bank A may be a bank without the power to mint electronic coins in the protocol 1000. Furthermore, it will be understood by those skilled in the art that the entities described as bank A and bank B in the instant embodiment need not be banks in alternate embodiments of the present invention.

In block 1004 of the trustee-based tracing bank protocol 1000 the user U acquires the required software as previously described in block 104 of the electronic cash setup protocol 100. The user U also sends its identification to the bank A in block 1004. The bank A later anonymously sends to the minting bank B all the information the bank B requires to sign the coin withdrawn by the user U. The bank A may act as a courier that is not able to determine which coins the user U and the bank B are communicating.

To implement this the bank A sends the account number of the user U to the user U in block 1008 and the user U sends its public signature key, $\text{sign}^P_u$, to the bank A in block 1012. The bank A puts the identification of the user U, the account number and public key into its database as shown in block 1016 and sends the bank public signature key, $\text{sign}^P_B$, to the user U in block 1020. The user U may generate any number of encryption key pairs and generate any number of electronic coins as shown in blocks 1024, 1028. The withdrawal values, along with the public keys of block 1024 and electronic coins encrypted with the public encryption key of the bank B, are then sent to the bank A as shown in block 1032. At a later time the withdrawal values, the $\rho$ values, the encryption keys, and the encrypted electronic coins are sent to the bank B as shown in block 1036. The bank B decrypts to recover $\text{coin\_sign}^P_k$ as shown in block 1040 and sends the coins to the bank A as shown in block 1044 of the trustee-based tracing setup protocol 1000

Figure 11:
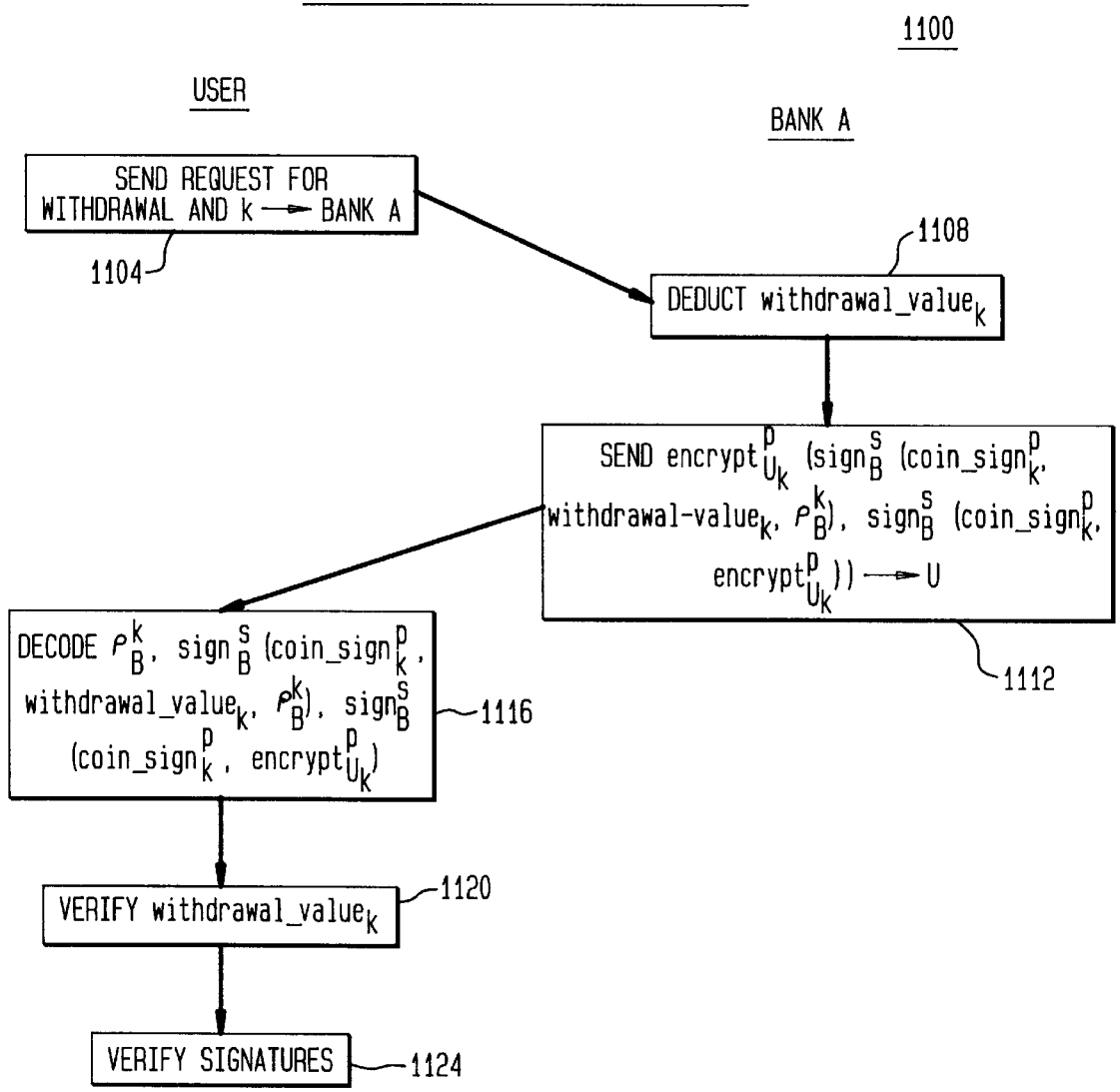
FIG. 11 is a flow chart representation of an electronic withdrawal protocol adapted for use with the protocol of FIG. 10 within the electronic cash system and method of the present invention.

Referring now to FIG. 11, there is shown the trustee-based withdrawal protocol 1100. In the trustee-based withdrawal protocol 1100 the user U sends a request for a withdrawal and a value k to a courier bank A as shown in block 1104. The courier bank A then deducts the withdrawal value associated with k, $\text{withdrawal\_value}_k$, from the account which the user U has previously opened as shown in block 1108. The courier bank A also sends $\text{encrypt}^P_{uk}(\text{sign}^s_B(\text{coin\_sign}^P_k, \text{withdrawal\_value}_k, \rho^k_B), \text{sign}^s_B(\text{coin\_sign}^P_k, \text{encrypt}^P_{uk}, \rho^k_B))$ to the user U as shown in block 1112. Thus, in block 1112 of the withdrawal protocol 1100 the bank A sends to the user U an electronic coin that the bank B has previously signed without the bank A being able to read the coin. In block 1116 the user U decrypts the encrypted transmission of block 1112. The thus recovered withdrawal value and signatures are verified by the user U in blocks 1120, 1124.

The protocols used for payment and deposit in connection with the trustee-based tracing of the system of the present invention may be similar to the electronic cash payment protocol 300 and the electronic cash deposit protocol 400 as set forth hereinabove. In the case of the trustee-based tracing protocol the courier bank A and the bank B may use a combination of hashing with secret keys and identification of the user U in order to be able to trace the electronic coin back to the user U. They do so in such a way as to be able to prove that the electronic coin being traced was issued to the user U without weakening the anonymity of other coins in the system.

Referring now to FIGS. 12, 13, 14, there are shown the anonymous transfer withdrawal protocol 1200, the anonymous transfer payment protocol 1300 and the anonymous deposit protocol 1400. The concept of tokens used in the anonymous transfer protocols 1200, 1300 and 1400 to enable transferability is disclosed in more detail in D. Chaum and T. P. Pedersen, "Transferred Cash Grows in Size," Advances in Cryptology—Proceedings of Eurocrypt 92, (1993), pp. 390–407. In the system of the present invention it is possible to use the anonymous transfer protocols 1200, 1300 and 1400 to obtain anonymous transferability of electronic cash using encryption. The setup phase required to use the anonymous transfer protocols 1200, 1300 and 1400 may be the same as that previously described with respect to the electronic cash setup protocol 100 except that the user U in the anonymous transfer protocols 1200, 1300 and 1400 learns the public token signing key, $\text{sign\_token}^P_B$, of the bank B.

There are two types of withdrawals associated with anonymous transferability in the anonymous transfer protocols 1200, 1300 and 1400. The first type of withdrawal is withdrawal of an ordinary electronic coin with a cash value withdrawal_value. The method for performing this type of withdrawal is substantially similar to that set forth hereinabove with respect to the electronic cash withdrawal protocol 200.

The other type of anonymous withdrawal is withdrawal of a transfer token, $(\text{token\_sign}^P, \text{tokens\_sign}^s), \text{sign\_token}^s_B (\text{token\_sign}^P)$, for use in receiving payments and transferring ordinary electronic coins by a party which is paid in one transaction and wishes to use the electronic coins to pay another entity. This is the type of transfer set forth in the anonymous transfer protocols 1200, 1300.

The transfer tokens of the anonymous transfer protocols 1200, 1300 have no inherent cash value. If the transferrer of the electronic coin of anonymous tranfer protocols 1200, 1300 attempts to overspend a transferred electronic coin the bank B can use the public part of the transfer token to identify the culprit.

In the withdrawal of a transfer token using the anonymous withdrawal protocol 1200 the key pair $(\text{token\_sign}^P, \text{token\_sign}_s)$ is generated in block 1204. The user U sends to the bank B the user password, $z_{u,i}$, the public key of the key pair as set forth in block 1204, and a copy of the public key signed by the secret key of the user U as set forth in block 1208. The bank B identifies the user U using the password $z_{u,i}$ and verifies the signed transmission of block 1208 as set forth in blocks 1212, 1216. The bank B independently computes the next value of the user password $z_{u,i+1}$ and sends the public key of the user U back to the user U signed by the secret key of the bank B as shown in block 1220. In block 1224 the user U verifies the signed transmission of block 1220. The user U independently computes the next password, $z_{u,i+1}$ in block 1228. Thus, the withdrawal protocol required for this procedure is similar to the withdrawal protocol 200 with a few important differences.

In order to permit payment of the cash amount payment_value to the payee S by a user U, the payee S chooses a random value $\gamma_s$ as shown in block 1304. The payee S also computes $\rho^s=H(\gamma_s,\text{counter}^s,S)$ as shown in block 1308. The payee S sends $\rho^s$ and token_sign$^P$ as part of a challenge to the user U in block 1312. The purpose of this challenge by the payee S is to prevent replay attacks and to confirm to a bank $B_s$ used by the payee S that the payee S is the recipient of the payment. The payee S then increments its counter in block 1312. The reason the value counter and the identity of the payee S are hidden is so that the recipient v of a further transfer of the electronic cash cannot identify the payee S.

The anonymous user U and the payee S use an authenticated key exchange protocol to agree on a mutual secret encryption key prior to performing the anonymous transfer payment protocol 1300. They then communicate the payment process in private so that eavesdroppers can not recognize the signing keys coin_sign$^P$,token_sign$^P$ if they later appear in other transfer protocols performed in accordance with the present invention.

When the payee S later sends the payment protocol and the random value $\gamma_s$ to the bank B, as shown in block 1404, the bank B verifies the payment protocol and $\rho S$ as shown in blocks 1408, 1412. The bank B increments its counter and verifies that the withdrawal is legitimate in block 1416. The bank B also verifies that the electronic coin being deposited is not overspent as shown in block 1420.

Figure 15:
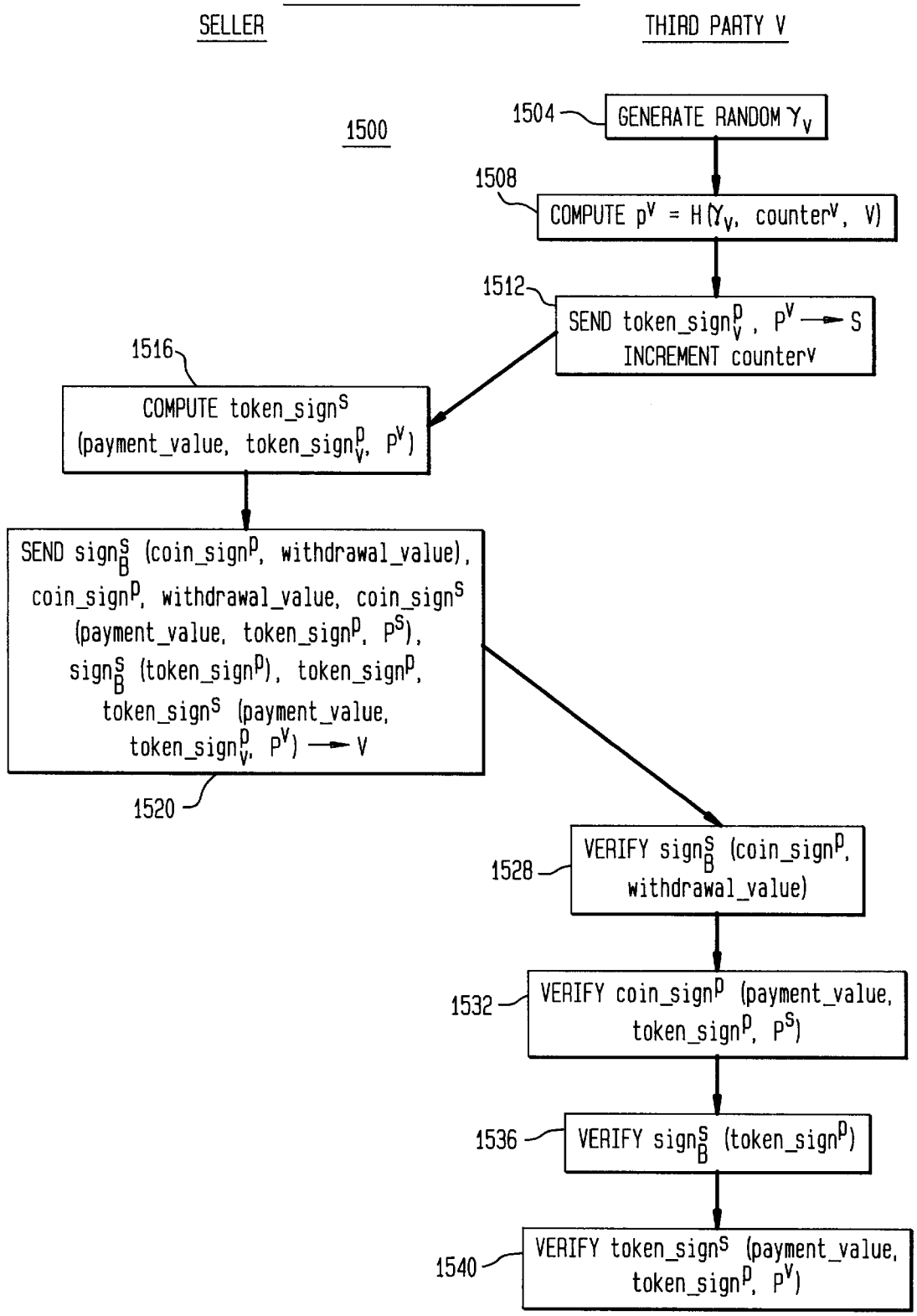
FIG. 15 is a flow chart representation of an electronic transfer protocol for transferring electronic cash from a payee to a third party suitable for use within the electronic cash system and method of the present invention.

Referring now to FIG. 15, there is shown the anonymous transfer protocol 1500 of the present invention. The anonymous transfer protocol 1500 may be used to permit the anonymous transfer of an electronic coin from a payee S to a third party in the electronic cash system of the present invention. The transfer of a previously spent electronic coin in the transfer protocol 1500 is similar to the first payment of an electronic coin protocol set forth in the anonymous transfer electronic cash payment protocol 1300 and others described hereinabove.

In the anonymous transfer protocol 1500 random value $\gamma_v$ is generated as shown in block 1504. A value of $\rho^v$ is determined in block 1508. The value $\rho^v$ and a token are sent to the payee S in block 1512. In the anonymous transfer protocol 1500 the payee S computes and uses a token in place of a regular electronic coin as shown in block 1516. The payee S then appends information from the third party v and transmits to the third party v in block 1520. The third party v then performs the verifications of blocks 1528–1540 of anonymous transfer protocol 1500.

Referring now to FIG. 16, there is shown the anonymous deposit protocol 1600. The anonymous deposit protocol 1600 may be used to deposit an electronic coin which was anonymously transferred according to the anonymous transfer protocol 1500. In the anonymous deposit protocol 1600 the third party v transmits to the bank B a record of the anonymous transfer and the random value $\gamma_v$, as shown in block 1604. The bank B then verifies that the transfer protocol 1500 was executed properly by the payee S as shown in block 1608. In block 1612 the bank B verifies $\rho^v=H(\rho_v,\text{counter}^v_B,v)$, which was received as part of the transmission of block 1604 and verifies the withdrawal and independently increments counter $^v_B$ as shown in block 1616. In block 1620 the bank B determines that the electronic cash was not overspent. The protocol 1600 deposit process should be encrypted.

Brickell, Gemmell, and Kravitz have proposed electronic cash systems which provably hide the identity of a user U in electronic financial transactions with the exception that the government G can trace the spending of the user U with certainty. See, for example, "Trustee-Based Tracing Extensions to Anonymous cash and the Making of Anonymous Change," *Proceedings of the Sixth Annual ACM-SIAM Symposium on Discrete Algorithms*, (1995), pp. 457–466. This system and method permits the government G to determine the recipient of the electronic cash paid by the user U and the amount paid. It will be understood by those skilled in the art that the following descriptions enable inventions not necessarily shown in the representations of FIGS. 1–16. It will also be understood that the following descriptions describe inventions which may be used in connection with the protocols of FIGS. 1–16.

Tracing by the government G in the further electronic systems of Brickell, Gemmell and Kravitz is possible only with the cooperation of several appointed trustees $T_i$. The appointed trustees $T_i$ are key-escrow agents in these systems. The primary disadvantage of systems of this type is that the systems may not be very efficient. They tend to require relatively large amounts of memory space for the banks to store the electronic coins and other information. They also tend to require a relatively large amount of processing power to generate and spend electronic coins. Furthermore, they rely on blind signature technology, such as that of Brands, or of Franklin and Yung.

In the system and method of the present invention trustee-based tracing is incorporated into protocols similar to those taught by Brands as referred to herein. Thus, this feature of the present invention may be understood to be an improvement of the protocols of Brands which allows for trustee-based tracing. There is no need for any tamper-resistant devices or any inconvenience to the user U in this method. The security of all parties in this method is based only upon cryptographic assumptions. Trustees $T_1$ and $T_2$ participate in an interactive process during the setup protocol when they conduct proofs of knowledge of a representation for each value $f_k$ wherein k indexes the electronic coin withdrawn by the user U and each electronic coin is understood to have a different value $f_k$.

Let p, q be large primes such that q|(p-1) and let $\xi cz_p^*$ be the subgroup of order q. Let g, $g_1, g_2, g_3, g_4$, d be generators of $\xi$ randomly chosen by the bank B. The values $h_i=g^{\alpha i}$ are information published by the bank B for verifying authenticity of the electronic coins wherein the index i refers to the denomination of the electronic coin. Knowledge of $\alpha i$ allows the bank B to mint coins of denomination i. The setup, withdrawal, and payment protocols are extensions of basic setup, withdrawal and payment protocols taught by Brands In the new setup protocol, the user U gives the trustees $T_1$ and $T_2$ information which allows them to link any payment involving each electronic coin to its withdrawal. This information is the combined knowledge of U's representation of the value $f_k=g_3^{\gamma 3,k}g_4^{\gamma 4,k}$. The trustees $T_1$ and $T_2$ can prove to the government G that they know the representation for this value of $f_k$.

In the setup with trustees $T_1$ and $T_2$ the user U generates random $u_1, u_2$ and sends $I_u=g_1^{u1}g_2^{u2}$ to the bank B. The bank B associates $I_u$ with the identity of the user U, $ID_u$, chooses a random $\alpha_i$ for each coin denomination i and broadcasts g and $h_i=g^{\alpha i}$. It will be understood that $x\epsilon_r S$ indicates that element X is chosen randomly from set S. If N is an upper bound on the number of electronic coins which the user U withdraws, the user U chooses $\{\gamma_{3,k}, \gamma_{4,k}\}$, for k=1 to N, $\epsilon_r Z_q \times Z_q$. For each k, the user U randomly splits $\gamma_{3,k}=S^k_{1,1}+S^k_{2,1}, \gamma_{4,k}=S^k_{1,2}+S^k_{2,2}$ mod(q) and sends $S^k_{1,1}, S^k_{1,2}$, to the trustee $T_1$ and $S^k_{2,1}$, $S^k_{2,2}$, to the trustee $T_2$. For each value of k, the user U sends $f_k=g_3\gamma^{3,k}g_4\gamma^{4,k}$ to the bank B. For each value of k, the trustees $T_1$ and $T_2$ prove combined knowledge of a representation of $f_k$ to the bank B relative to $g_3$ and $g_4$. The new withdrawal protocol is very similar to a protocol taught by Brands except that $m=I_u df_k$.

The underlying idea of the protocol of Brands is that the bank B provides the user U with a blind signature that is a tuple (A,B,z',a',b',r'). This tuple satisfies the equations $g'=h^H(m',z',a',b',A)a' \bmod(p)$ and $m'^{r'}=z'^{H(m',z',a',b',A)}b' \bmod(p)$. If H is a one-way collision-free hash function, it is believed to be hard to create a tuple of this form without finding the discrete log of h. The features of Brands referred to may be found, in particular, in S. Brands, "Electronic Cash Systems Based on the Representation Problem in Groups of Prime Order," *Preproceedings of CRYPTO* 93. Furthermore, because the signature is blinded the tuple is uniformly distributed among all such tuples when one is given only the view of the conversation as seen by the bank B.

When performing a withdrawal with trustees $T_1$ and $T_2$ for the denomination i for the kth withdrawal by the user U, let $h=h_i$, $\alpha=\alpha_i$. The user U proves knowledge of a representation of $I_u=g_1^{u_1}g_2^{u_2} \bmod(p)$ to the bank B. The bank B then chooses $w \epsilon_r Z_q$, sets $m=I_u df_k$ and sends $z=m^\alpha$, $a=g^w$, $b=m^w$ to the user U. The user U chooses $s \epsilon_r Z_q^*$ sets $m'=m^s$, $z'=z^s$, chooses $x_1,x_2,x_4,x_5$, $\epsilon_r Z_q$, and sets $$y_1=u_1 s-x_1 \bmod(q)$$

$$y_2=u_2 s-x_2 \bmod(q)$$

$$y_4=\gamma_{4,k} s-x_3 \bmod(q)$$

$$y_5=s-x_5 \bmod(q),$$

where $A=g_1^{x_1}g_2^{x_2}g_3^{s\gamma_{3,k}}g_4^{x_4}$ and $B=g_1^{y_1}g_2^{y_2}g_4^{y_4}d^{y_5}$. The user U chooses u, $v \epsilon_r Z_q^*$, sets $a'=a^u g^v$, $b'=b^{su}(m')^v$, $c'=H(m',z',a',b',A)$ and sends $c=c'/u$ to the bank B. The bank B sends $r=\alpha c+w \bmod(q)$ to the user U. The user U then verifies $q'=h^c a, m'^r=z^c b \bmod(p)$, sets $r'=ru+v \bmod(p)$ and sets $sign_B(A,B)=(z',a',b',r')$.

In the corresponding payment protocol, the user U is forced to reveal the value $r_3=\gamma_{3,k}s$. Later, if the trustees $T_1$ and $T_2$ give the government G the value $\gamma_{3,k}$ from the execution of the withdrawal protocol and the government G has the values m', $r_3=r_{3,k}s$ from an execution of a payment protocol, then the government G can compute s and $I_u d=m'^{s**(-1)}/f_k \bmod(p)$, thereby linking the payment with the withdrawal.

When performing a payment with the trustees $T_1$ and $T_2$, the user U sends $A,B,sign_B(A,B)=(z',a',b',r')$, $r_3=\gamma_{3,k}s \bmod(q)$ to the payee S. The payee S then verifies that $AB \neq 1$ and $sign_B(A,B)$. The payee S then sends $c_1=H(ID_s,time,r_3,A,B)$ to the user U. The user U sends $r_1=x_1+c_1 y_1 \bmod(q)$, $r_2=x_2+c_1 y_2$, $r_4=x_4+c_1 y_4$, and $r_5=x_5+c_1 y_5$ to the payee S. The payee S verifies $g_1^{r_1}g_2^{r_2}g_3^{r_3}g_4^{r_4}d^{r_5}=AB^{c_1} \bmod(p)$. In the deposit protocol, the payee S sends a transcript of the payment protocol to both the bank B and the government G.

The procedure which the government G can use to trace multiple spenders is substantially similar to that set forth in the basic protocols of Brands. When tracing multiple spenders the bank B has records of an electronic coin spent two times, with two different challenges, $\beta,\beta'$. To identify the user U, the bank B uses the two sets of responses $(r_1,r_2,r_3)$ and $(r_1',r_2',r_3')$ and computes $$z_2=(r_3-r_3')/(\beta-\beta')$$

$$z_1=r_3-\beta z_2,$$

$$s=z_1+z_2$$

$$x_2=(r'-r_1')/(\beta-\beta')$$

$$x_1=r_1-\beta x_2$$

$$u_1=x_1+x_2$$

$$y_2=(r_2-r_2')/(\beta-\beta')$$

$$y_1=r_2-\beta y_2$$

$$u_2=y_1+y_2$$

$$I_u=g_1^{u_1}g_2^{u_2}.$$

When presented with a court order the trustees $T_1$ and $T_2$ provide the government G with the means required to trace the user U.

In the trace-one payment protocol, the trustees $T_1$ and $T_2$ do not provide the government G with the value $\gamma_{3,k}$. Instead, they determine only whether $m'^{(r3)(-1)}=(I_u df_k)^{(\gamma 3,k)(-1)}$ by attempting to prove knowledge of a representation of $I_u df_k$ in terms of the single generator $m'^{(r3)**(-1)}$.

To trace with the trustees $T_1$ and $T_2$ the government G asks the trustees $T_1$ and $T_2$ for all sets of withdrawal values $\{s_{i,j}\}_{i,j \in \{1,2\}}$ for the user U. For all withdrawals G can compute $\gamma_{3,k}=s^k_{1,1}+s^k_{2,1} \bmod(q)$ and search the database of payment transcripts for $I_u df_k^{(\gamma 3,k)**(-1)}$. In this manner the electronic coin of the user U is determined.

In trace-one payment, the government G determines whether a particular payment is previously made by a user U. To perform this operation let $\{s^k_{i,j}\}_{i=1,2;j=1,2;k=1,\ldots,N}$ be the shares given by the user U to the trustees $T_1$ and $T_2$ during the N executions of the withdrawal protocol performed by the user U. The government G obtains a court C signature for the payment in question and sends $m',r_3,I_u$, and the court signature $sign_c(m',r_3,I_u)$ to the trustees $T_1$ and $T_2$. For each value $f_k$ the trustees $T_1$ and $T_2$ attempt to prove combined knowledge of a representation of $I_u df_k$ relative to $m'^{((r3)**(-1)mod(q))}$ using their knowledge of $s^k_{1,1}$ and $s^k_{2,1}$. If the trustees $T_1$ and $T_2$ succeed, the government G assumes that the electronic coin involving m' was spent by the user U.

The above protocols are believed to preserve the protections of Brands against counterfeiting and multiple spending. Furthermore, the values $A,B,z',a',b',r',r_1,r_2,r_3,r_4,r_5,c$ appearing in the payments of the coins transmitted by a user U are completely independent from the values $I_u,f_k,w,m,z,a,b,c,r$, and the values appearing in the trustees' proof of knowledge of a representation of $f_k$, appearing in the withdrawals of the user U. Therefore, without help from both the trustees $T_1$ and $T_2$ the electronic cash of the user U is believed to be information-theoretically anonymous when using this method.

If the user U cannot forge Schnorr signatures and if the hash function, H, is designed correctly, then it is infeasible for the user U to prevent the trustees $T_1$ and $T_2$ from linking withdrawals to payments. If the user U does not reveal the representation $I_u=g_1^{u_1}g_2^{u_2}$, then the government G even with the help of both the trustees $T_1$ and $T_2$ could successfully claim that an honest user U made a payment it did not make only if the government G or the trustees $T_1$ and $T_2$ can compute discrete logs. It there is a legitimate payment such that an honest government G is able to link withdrawals from both a user U and a user Û to that payment, then the user U and the user Û can combine their information to get a non-trivial representation of 1 relative to generators $g_1,g_2,g_4,d$. This means that dishonest users cannot create false links between withdrawals and payments.

By distributing the power to trace the trustee-based cash systems described hereinabove are designed to improve public confidence in the privacy preservation goals of electronic cash systems while assuring the government G that it can reliably monitor suspected criminal activity under court order. One trouble with relying solely on human trustees such as trustees $T_1$ and $T_2$ is that it is seemingly impossible to guard against the case where all the trustees misbehave and conspire with a corrupt government G to trace the spending habits of honest citizens. Thus, the inventive method includes a solution which guarantees the innocent user U at least notification that it is being traced even if the government G and all human trustees $T_1$ and $T_2$ conspire against the user U. This solution includes an electronic trustee $T_E$ in which both the government G and the user U may feel confident in placing their faith. The trustee system set forth is described in terms of electronic cash. However, it will be understood by those skilled in the art that similar trustees may be used in the context of other types of key-escrow systems.

Thus it will be understood that certain guarantees are required for the various parties involved to have confidence in electronic cash systems such as those described herein. One guarantee is that the user U wants to be sure that if it is being traced it will be notified of this fact within some specified amount of time. With electronic cash, rendering the knowledge of a trace available to a user does not hamper the tracing of the user's past transactions. Consequently, the user community can benefit from timely notification of cash traces. This is unlike the recovery of plaintext wiretapped communications which is the province of CLIPPER. Under current law, wiretaps are not allowed without prior court authorization even if the wiretappers cannot yet decipher the intercepted traffic. Therefore, law enforcement cannot legally decrypt conversations that take place before a wiretap is approved.

Another requirement is that the government G needs to be certain that it can access each share of the key of the user U, where each such share is held by some electronic trustee $T_E$. A solution to this problem requires both parties to build separately a different part of a two-part electronic trustee. The government may build an inner part of the electronic trustee $T_E$ without knowledge of the eventual user U corresponding to the electronic trustee $T_E$. This part should be read-proof against the user U. The entire inner part may be embedded in the latest high-tech tamper-resistant material. By read-proof it is intended that the user U cannot alter any component of the inner part without erasing the secret signature key, $\text{Sig}^s{}_T$, of the inner part and that the user U cannot read the value of $\text{Sig}^s{}_T$. The government G extracts the corresponding value of $\text{Sig}^P{}_T$ from the inner part prior to surrendering control of the inner part to the user U.

In addition to securely maintaining $\text{Sig}^s{}_T$, the inner part accepts as input the private key $\theta_T$ corresponding to the trustee public key $E_T$ into a register which can be loaded exactly once by the outer part and is non-erasable but readable. This is the register which the government G needs to read from each electronic trustee $T_E$ corresponding to user U to enable a trace of spending by the user U. In order to ensure a match between the value of $\theta_T$, as held by the electronic trustee $T_E$ after installation by the user U of the outer part, and the circulated value of $E_T$, certain precautions must be taken.

After verifying that $\theta_T = E_T^{-1}$ for the supplied or computed value of $E_T$, $\text{Sig}^s{}_T(E_T)$ is generated by the inner part, where no value $E_T'$, distinct from the value of $E_T$ for which the corresponding value of $\theta_T$ is loaded into permanent memory, will be signed. To verify that the user U has placed the intact inner part inside the electronic trustee $T_E$ random challenges to be signed using $\text{Sig}^s{}_T$ are administered by the government G, and are limited in number to the preset value in the inner part.

The outer part of the electronic trustee $T_E$, built by the user U or its specified vendor, monitors the output of the $\text{Sig}^s{}_T$ function and controls the transmissions of the electronic trustee $T_E$ in order to eliminate leakage with respect to the value of $\theta_T$.

In order to electronically notify the user U if an attempt has been made to recover the value of $\theta_T$ from the electronic trustee $T_E$, while protecting the government G from false claims of unauthorized access to $\theta_T$, the following procedure is specified: The outer part generates a pulse key pair, $(\text{Kpulse}_T^s, \text{Kpulse}_T^P)$, where the public key $\text{Kpulse}_T^P$ is registered with a third party prior to deployment of the electronic trustee $T_E$. $\text{Kpulse}_T^s$ is used to sign periodic sequenced messages, verifiable using $\text{Kpulse}_T^P$, where such signed messages effectively affirm that no attempt has been made to retrieve $\theta_T$, since the user U can implement the outer part so that $\text{Kpulse}_T^s$ is automatically erased upon intrusion of the electronic trustee $T_E$.

After the government G is satisfied that nothing has been introduced into the outer part which can later obliterate $\theta_T$ from the retrievable memory of the inner part, the electronic trustee $T_E$ is coated under user and government supervision. It is in the legitimate interest of the user U to apply a coating which alters upon tampering and is impossible to reproduce exactly or to predetermine. The government G assures itself that the outer part and the coating are constructed so that the coating cannot be modified spontaneously or from within. A digitization of the coating is signed by the $\text{Kpuls}_T^s$ key of the outer part. The user U can design and implement the $\text{Kpulse}_T^s$ function so as to thereafter accept only internally generated inputs. Alternatively, the digitized value of the coating is signed by the user U or its legal representative by conventional handwritten means. The signed version of the coating value is supplied to the government G. The electronic trustee $T_E$ is from then on, held securely under government control.

The following addresses the problem of the user U wishing to make an anonymous purchase from a payee S but having incorrect change. It is assumed that the payee S in this system has a computer link to a bank B but that the user U does not wish to identify itself to the bank B in order to prevent the bank B from associating it with the payee S. It is also assumed that the user U has Y dollars in coins and that the user U wishes to make a purchase worth X<Y dollars.

A protocol is therefore presented hereinbelow which allows a user U to present anonymously a set of electronic coins worth Y dollars to the bank B and receive in return another set of electronic coins also worth Y dollars but in different denominations. The user U chooses the denominations in such a way that it can combine the returned electronic coins to get X dollars.

When getting anonymous change the user U wishes to give the bank B an amount equal to Y dollars in coins of different denominations. The user U uses the payment protocol to pay the Y dollars in electronic coins to the bank B without revealing $ID_u$ and tells the bank B the desired denominations of the change. The bank B checks that the requested coins total Y dollars. Let $m'_{old}$ be a value from one of the coins that the user U paid during this transaction. For every electronic coin to be given out as change the bank B uses the appropriate value of $h_i$. For complete anonymity the bank B and the user U use value $m_{new} = m'_{old}$ for each new electronic coin withdrawn. For trustee-based tracing, the user U generates a new value $f_{new}=g_3\gamma^3 g_4\gamma^4$ for each new coin and sends to the trustees shares of $\gamma_3,\gamma_4$. The user U and the bank B use the value $m_{new}=m'_{old}f_{new}$ in the withdrawal of that electronic coin.

The above protocol, when added to either the basic protocols of Brands or to the trustee-based system, maintains the following properties. The augmented system is secure against counterfeiting and multiple spending by a user U. Without help from all the trustees, the values appearing in the payments of electronic coins transmitted by the user U are completely independent from the values appearing in the withdrawals. The trustees may then combine their information and trace both the original coins of the user U and the coins given as change.

Unlike prior art RSA signature schemes, the Digital Signature Algorithm, as embodied in the Digital Signature Standard, utilizes randomness in the signing process. Furthermore, unlike the El Gamal signature scheme, the Digital Signature Algorithm apparently does not transmit enough information in its signatures to allow recovery of the public key. For these reasons the functionality of the Digital Signature Algorithm may be efficiently extended beyond a straight forward digital signature mechanism in order to provide (1) sender anonymity, (2) transaction security, and (3) database security.

Thus with respect to (1) it is possible to eliminate the need for an encryption function for the purpose of hiding identities and preventing the linking of transactions to the same individual. By avoiding the use of encryption, while maintaining the ability to negotiate unlinkable anonymous transactions, the present invention which extends the operation of the Digital Signature Algorithm provides the ability to apply cryptography in order to secure applications such as electronic commerce without relying on the prior art found in several patents on public-key cryptography. Furthermore, it is possible to simultaneously allow the legitimate recipients to access the database entries corresponding to the identity of sender.

Additionally, with respect to (2) it is possible to prevent the acceptable replay of transactions by anyone other than the legitimate transaction originator, even if given read-access to the hardware-secured database. With respect to (3) it is possible to prevent modification of the user-specific information held in the hardware-secured database without authorization transmitted by the user U.

In this method the user U generates a private key $sign^s_u$ denoted by $x_u$ and a corresponding public key $sign^P_u = g^{x_u}$ mod p also denoted by $y_u$, where the parameters g and p are defined within the Digital Signature Standard. In this process the Digital Signature Standard signature is also transmitted and $z_{u,i+1}$ is computed as an extension of the process of verifying the signature of the Digital Signature Standard. The initial value of $z_{u,i}$ is randomly or pseudorandonmly generated. The value $sign^P_u$ is stored under the address $z_{u,i}$ in the central database and is not made public.

In the signing and transaction transmittal the user U appends $z_{u,i}$ to a message m, and signs $SHA(m,z_{u,i})$, using the Digital Signature Standard. To obtain sender anonymity as specified in (1) SHA(m) would suffice. In this method SHA is the secure hash algorithm function specified in the Secure Hash Standard, as understood by those skilled in the art. In this method, $z_{u,i}=SHA(y_u^{su^{**}(-1)ru\ mod(q)} mod(p))$, where $[r_u,s_u]$ constitutes the Digital Signature Standard signature transmitted as part of the previous transaction transmittal, if any. Otherwise, the initial value of $z_{u,i}$ is used. The signals m, $z_{u,i}$, and the current Digital Signature Standard signature as previously described are transmitted.

In the transaction receipt and verification the received $z_{u,i}$ is used to access $sign^P_u$ in the database and to verify the current signature of the Digital Signature Standard as applied to the message m and $z_{u,i}$. If the signature is valid, the new value of the user password, $z_{u,i+1}$, is computed as $SHA(y_u^{su^{}(-1)ru\ mod(q)} mod(p))$, where $y_u^{su^{}(-1)ru\ mod(q)}$ mod (p) was used during the current signature verification. The new value $z_{u,i+1}$ overwrites the previous value $z_{u,i}$.

Thus with respect to (1) above, without knowledge of y's, z's are not partitionable or traceable to the transaction originators. With respect to (2) above, unauthorized replay is prevented because $z_u$ changes each time and must be signed for the transaction to be acceptable. With respect to (3) above, if the signature is found to be valid, the user U data corresponding to $y_u$ and addressed by $z_u$ can be modified within the hardware secured database. It will be understood by those skilled in the art that a more general function of $y_u$, $s_u$, and $r_u$ may be substituted in the definition of $z_u$.

The following protocols are designed to be used in settings wherein most of the transactions may usually be conducted on-line. In these situations a bank B may occasionally lose contact with the system for a limited period of time. When this happens the off-line aspects of the system enable most transactions to take place during the downtime. One of the primary advantages of this system is that it does not use public key cryptography and it thus avoids the need to license or purchase such patented technology.

For each payee S, the bank B sets a limit on the number of outstanding coins for the payee S, i.e., those S-designated coins which are not yet expired and are still in circulation. When the system of the present invention is on-line, this does not matter because customers wishing to make payments to the payee S can bring coins into and out of circulation in the same transaction. It will be understood that $x\epsilon_u S$ indicates that element x is chosen uniformly at random from the set S. Additionally, let the user U be an arbitrary system user, let B be the bank, let the payee S be a seller of goods, and let C be the customer.

In the initial set-up the user U acquires the software and provides its identification to the bank B. The bank B provides account_number$_u$ to the user U which then provides the bank B with the random seed $r_0^{U,B}$ from the software of the user U that will be used for correspondence between the user U and the bank B. The bank B enters (U,account_number$_u$,$r_0^{U,B}$) into the bank database.

In the coin set-up protocol the customer C uses a one-time identification to identify itself to the bank B and requests q coins from the bank B which are spendable to the seller S. The bank B responds with an encrypted and authenticated message of acknowledgment. At such time that q plus the number of outstanding coins for the seller S is less than or equal to the maximum allowable number of outstanding coins for the seller S, the bank B randomly chooses a set $\theta=\{coin_s^i\}_{i\in\{1,\ldots,q\}}$ of coins of appropriate denominations, chooses $r_0^{C,S}\epsilon_u\{0,1\}^k$ and sends $(S,\theta,r_0^{C,S})$, encrypted and authenticated to the customer C. The bank B sends $\{g(coin_s^i)\}_{i\in\{1,\ldots,q\}}$ and $r_0^{C,S}$, as well as acknowledgment of the last deposit to the seller S. All transmissions are sent authenticated. The signal $r_0^{C,S}$ is transmitted encrypted as well.

In order to perform the protocol $\Sigma$coin for the payment of the amount value$_1$ the customer C chooses $\Gamma\subset\theta$ {or: $\Gamma$ a subset of $\theta$} such that summed over the coins in $\Gamma$, $\Sigma$ value(coin$_s^i$)=value$_1$. The customer C sends to the seller $\Gamma$ and address$_c$ which are authenticated using $r_0^{C,S}$. The value address$_c$ can also be encrypted for privacy using $r_0^{C,S}$. The seller S verifies the authentication, verifies that $\Sigma$ value (coin$_s^i$)=value$_1$, checks that for each coin$_s^i$ in $\Gamma$, g(coin$_s^i$) is on S's list of coin hash values, verifies that Γ contains no repeats, removes the set $\{g(coin_s^i)\}$ for $coin_s^i \epsilon \Gamma$ from S's list of coin hash values and, if appropriate, sends the merchandise to $address_c$. In the protocol for the deposit of the amount $value_1$ the payee S identifies itself to the bank B and sends Γ to the bank B.

Let $H_2$ be a one-way hash function mapping into k bits. Given a string x, and indices i<j let $x_{\{i,\ldots,j\}}$ be the bits $x_i$ through $x_j$, inclusive. In the following protocols, x is the party that sends encrypted messages, identifiers and authenticated messages. In general, the encryption, identification, and authentication can be sent by either X or Y, in any combination.

In the encryption and one-time identification protocols let X and Y both know a k-bit session key $r_i^{X,Y}$. The value $r_0^{X,Y}$ is a random seed that they agree upon initially. In order to identify itself to Y,X sends the ith password: $[r_i^{X,Y}]_{\{2K/3+1,\ldots,k\}}$ to Y. For X to send a message $m_i \epsilon (0,1)^{k/6}$ to Y,X chooses $r \epsilon_u \{0,1\}^{k/6}$ and sends $(m_i|r)[r_i^{X,Y}]_{\{1,\ldots,k/3\}}$ to Y. Y then recovers $(m_i|r)$ and X and Y create a new session key $r_{i+1}^{X,Y} = H_2(r_i^{X,Y}, r)$, and set i←i+1.

In the case of a one-time authentication the following protocol may be used. At the same time as sending a message $m_i$, X sends the authentication $H_2([r_i^{X,Y}]_{\{(k/3)+1,\ldots,2k/3\}}, m_i, 0)$ to Y. Y verifies the authentication message and sends the authentication $H_2([r_i^{X,Y}]_{\{k/3+1,\ldots,2k/3\}}, m_i, 1)$ to X. X verifies Y's authentication message.

It will be appreciated by those skilled in the art that changes may be made to the embodiments described above without departing from the broad inventive concept thereof. It is understood therefore, that this invention is not limited to the embodiments disclosed, but it is intended to cover modifications within the spirit and scope of the present invention as defined by the appended claims.

What is claimed is:

1. In an off-line electronic cash system having an electronic coin, a bank B, a user U having an account at said bank B and a payee S, a method for performing an electronic cash transfer independently of public key cryptography, comprising the steps of:

(a) withdrawing said electronic coin from said bank B by said user U;

(b) storing an electronic record of said electronic coin by said bank B;

(c) paying said electronic coin to said payee S by said user U;

(d) depositing said electronic coin with said bank B by said payee S;

(e) determining that said electronic coin is spent in accordance with the depositing of step (d);

(f) deleting said record by said bank B in response to the determining of step (e);

(g) determining a further deposit of said electronic coin after said deleting of said record; and (h) determining said user U in accordance with said determining of said further deposit.

2. The off-line electronic cash transfer method of claim 1, wherein the user U has a user password $z_{u,i}$ and the value of said electronic coin is withdrawal_value and step (b) comprises the further steps of:

(i) generating by said user U a key pair ($coin\_sign^P$, $coin\_sign^s$) wherein $coin\_sign^P$ is a public signing key and $coin\_sign^s$ is a secret signing key;

(i) transmitting ($z_{u,i}$, $coin\_sign^P$, withdrawal_value) by said user U to said bank B;

(k) verifying the transmission of step (g) by bank B;

(l) deducting withdrawal_value from said account of said user U; and (m) transmitting ($coin\_sign^P$, withdrawal_value) to said user U by said bank B.

3. The off-line electronic cash transfer method of claim 2, wherein the transmission of step (m) is signed by a secret signature key $sign^s_B$ of said bank B.

4. The off-line electronic cash transfer method of claim 3, comprising the further step of verifying the transmission of step (m) by said user U using a public signature key $sign^P_B$ of said bank B.

5. The off-line electronic cash transfer method of claim 4, wherein the transmission of step (m) is signed by said bank B using said secret signature key $sign^s_B$.

6. The off-line electronic cash transfer method of claim 2 wherein the transmission of step (i) is signed by said user U using a secret signature key $sign^s_u$ of said user U.

7. The off-line electronic cash transfer method of claim 1, further comprising the steps of:

(n) transmitting by said user U to said payee S a representation of a payment value and a representation of said electronic coin provided to said user U by said bank B in step (a); and (o) verifying said electronic coin by said payee S.

8. The off-line electronic cash transfer method of claim 7, wherein said payee S has a challenge counter and said payee S transmits said challenge counter to said user U before the transmitting of step (n).

9. The off-line electronic cash transfer method of claim 8, wherein the representation of step (n) is determined by said challenge counter.

10. The off-line electronic cash transfer method of claim 8, wherein step (d) comprises verifying said challenge counter by said bank B.

11. The off-line electronic cash transfer method of claim 8, wherein step (d) comprises incrementing said challenge counter by said bank B.

12. The off-line electronic cash transfer method of claim 7, wherein the representation of step (n) is signed by said user U using a secret signature key.

13. The off-line electronic cash transfer method of claim 12, wherein step (d) comprises verifying said representation of step (n) by said bank B.

14. The off-line electronic cash transfer method of claim 7, wherein said electronic coin is signed by said bank B using a secret signature key $sign^s_B$.

15. The off-line electronic cash transfer method of claim 1, wherein step (d) comprises sending a record of the paying of step (c) by said payee S.

16. The off-line electronic cash transfer method of claim 1, further comprising a user password $z_{u,i}$ is wherein said user password $z_{u,i}$ is an indexed password and said user U and said bank B separately determine a further indexed password $z_{u,i+1}$ in accordance with said indexed password $z_{u,i}$.

17. The off-line electronic cash transfer method of claim 16, wherein said further indexed password $z_{u,i+1}$ is determined in accordance with separate information shared by said user U and said bank B.

18. The off-line electronic cash transfer method of claim 1, wherein a plurality of deposits occur according to step (a) before the determining of step (e).

19. The off-line electronic cash transfer method of claim 1, wherein said system includes first and second differing banks and the withdrawing of step (a) is performed from said first bank and the depositing of step (d) is performed with said second bank.

20. The off-line electronic cash transfer method of claim 1, wherein said system includes first and second payees and said first payee receives said electronic coin in step (c) and transfers said electronic coin to said second payee and the depositing of step (d) is performed by said second payee.

21. The off-line electronic cash transfer method of claim 1, wherein an identification of said payee S is embedded in said electronic coin and only the identified payee S can perform the depositing of step (d).

22. The off-line electronic cash transfer method of claim 1, wherein said method is performed independently of public key cryptography.

23. The off-line electronic cash transfer method of claim 1, wherein said method is performed using cryptography which is only symmetric-key cryptography.

24. In an off-line electronic cash system having an electronic coin with a value withdrawal_value, a bank B, a user U having a user password and an account at said bank B and a payee S, a method for performing an electronic cash transfer independently of public key cryptography, comprising the steps of:

(a) withdrawing said electronic coin from said bank B by said user U;

(b) storing an electronic record of said electronic coin by said bank B;

(c) paying said electronic coin to said payee S by said user U;

(d) depositing said electronic coin with said bank B by said payee S;

(e) determining that said electronic coin is spent in accordance with the depositing of step (d);

(f) generating by said user U a key pair (coin_sign$^P$, coin_sign$^s$) wherein said coin_sign$^P$ is a public signing key and said coin_sign$^s$ is a secret signing key;

(g) transmitting ($z_{u,i}$,coin_sign$^P$,withdrawal_value) by said user U to said bank B;

(h) verifying the transmission of step (g) by bank B;

(i) deducting withdrawal_value from said account of said user U; and (j) transmitting (coin_sign$^P$,withdrawal_value) to said user U by said bank B.

* * * * *